(12) United States Patent
Shigemoto

(10) Patent No.: US 6,293,160 B1
(45) Date of Patent: *Sep. 25, 2001

(54) LOAD SENSOR AND POINTING EQUIPMENT INCORPORATING THE SAME

(75) Inventor: Hideki Shigemoto, Osaka (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/055,030

(22) Filed: Apr. 3, 1998

(30) Foreign Application Priority Data

| Apr. 4, 1997 | (JP) | 9-086388 |
| Jul. 22, 1997 | (JP) | 9-195364 |
| Nov. 18, 1997 | (JP) | 9-316763 |

(51) Int. Cl.⁷ ................................................ G01L 1/04
(52) U.S. Cl. ........................................................ 73/862.632
(58) Field of Search ........................ 73/862.632, 862.65, 73/788, 849, 795; 177/211; 463/38

(56) References Cited

U.S. PATENT DOCUMENTS

| 4,064,744 | * 12/1977 | Kistler .................................. 73/88.5 |
| 4,876,524 | 10/1989 | Jenkins . |
| 5,231,386 | 7/1993 | Bradenburg et al. . |
| 5,361,642 | 11/1994 | Welch . |
| 5,499,041 | * 3/1996 | Bradenburg et al. ................ 345/174 |
| 5,657,051 | 8/1997 | Liao . |
| 5,705,778 | * 1/1998 | Matsui et al. .......................... 200/11 |

FOREIGN PATENT DOCUMENTS

| 0663 648 A2 | 7/1995 | (EP) . |
| 0717 424 A2 | 6/1996 | (EP) . |
| 59-210603 | 11/1984 | (JP) . |
| 07174646 | 7/1995 | (JP) . |
| 7-174646 | 7/1995 | (JP) . |
| 08087375 | 2/1996 | (JP) . |

OTHER PUBLICATIONS

European search report for application No. 98105365.5 dated Aug. 14, 1998.

* cited by examiner

Primary Examiner—Benjamin R. Fuller
Assistant Examiner—Jewel V. Thompson
(74) Attorney, Agent, or Firm—Ratner & Prestia

(57) ABSTRACT

In an operating part located at the center of an elastic board having a first and a second pairs of strain detecting elements, a through hole is provided. The through hole is fitted with an operating rod allowing the up and down movement. Underneath the operating rod, a push button switch is provided. A cursor on a display screen may be moved by horizontal manipulation of the operating rod, and the switch may be put into action for input by vertical manipulation of the operating rod.

33 Claims, 20 Drawing Sheets

LOAD SENSOR AND POINTING EQUIPMENT INCORPORATING THE SAME

FIELD OF THE INVENTION

The present invention relates to a load sensor and a pointing equipment incorporating the load sensor, built in, for example, game machines for their operating board, pointing device of personal computers, remote controllers of various electronic appliances, for inputting coordinates (two-dimensional) on a display screen by manipulating an operating rod in the front-rear and right-left directions.

BACKGROUND OF THE INVENTION

Among the conventional load sensors, a load sensor as disclosed in the Japanese Patent Laid-open No. 07-174646 is widely known. FIG. 30 shows a perspective view of the conventional load sensor. An elastic board 1 is fixed at four corners to a base 3 with a fixing member 4, and an operating rod 2 made of a rigid material is provided at the center of elastic board 1. When the end of operating rod 2 is given with a force in parallel with the elastic board 1, the elastic board 1 makes a deformation. In the areas between the operating rod 2 and the fixing member 4, a pair of strain detecting elements 5 and 6 are provided respectively on lines connecting the fixing member 4 and the operating rod 2 forming right angles to each other at a same distance from the operating rod 2, totalling two pairs; the first pair of strain detecting elements 5 comprising elements 5A and 5B, while the second pair of strain detecting elements 6 comprising elements 6A and 6B. These elements 5A, 5B, 6A and 6B are strain-responsive resistor elements and have a same value of resistance.

Operation of the load sensor is described referring to FIG. 31. When the operating rod 2 is given at its end with a force in the direction P1 that is parallel to the elastic board 1 and going towards element 5A, the element 5A makes, together with the elastic board 1, a concave deformation, while the element 5B a convex deformation. As a result of the deformation, the resistance value of element 5A goes down, while that of element 5B goes up. Through calculation of difference in the shift of resistance value between element 5A and element 5B, the shift of resistance value is doubled, and outputted to represent the force applied to. In the mean time, the elements 6A and 6B receive only a torsional stress of a same direction, and there is no difference in the shift of resistance value between elements 6A and 6B. Therefore, only a force in the direction of coordinate axis of the first pair of strain detecting elements 5 is detected.

When the operating rod 2 is given at its end with a force in the direction P2 that is parallel to the elastic board 1 and going towards the middle point between element 5A and element 6A, the element 5A and the element 6A make a concave deformation, while the element 5B and the element 6B a convex deformation. As a result of the deformations, the resistance value of the elements 5A and 6A goes down, while that of the elements 5B and 6B goes up. The difference in the shift of resistance value between element 5A and element 5B of the first pair of strain detecting element 5, and the difference in the shift of resistance value between element 6A and element 6B of the second pair of strain detecting element 6 are calculated respectively to compare the differences, and the strength and the direction of the force applied to are detected and outputted. In the way described above, a force applied to the operating rod 2 is split into the elements of two coordinate axes, and the strength and direction are detected.

The conventional load sensors, however, carry with them tasks for improvement with respect to the ease of operation, in the following points.

Point 1 is that a load sensor is employed only as means for moving cursor on a display screen, and an execute switch is provided separately. An operator has to move his or her fingers to the execute switch every time when to make execute action.

Point 2 is that an operating rod is protruding for a certain length in excess of an overall contour shape of an appliance. This is a limiting factor in designing an appliance slim. Also, such an operating rod is readily affected by an external force, and could easily be deformed if the force is big.

Point 3 is that an expensive ceramic plate or enamel plate is used for the elastic board, and that the operating load-output voltage level relation of a load sensor is determined only by stiffness of the elastic board. Which means that the designing freedom is limited, and it is not easy to meet the diversifying requirements of customers swiftly and economically.

SUMMARY OF THE INVENTION

The present invention offers an easy-to-use load sensor.

An exemplary embodiment of the invented load sensor comprises an elastic board having at least two strain detecting elements, an operating portion having a through hole positioned at the center of the elastic board, a base on which the elastic board is to be fixed at the edges, and an operating rod inserted in the through hole.

Preferably, a switch is provided under an operating rod inserted through the through hole of the elastic board. With such structure, an action for applying a force in parallel with the elastic board and an action of applying a vertical force for operating the switch may be conducted by an operator without changing the position of hand. This contributes to improve the efficiency of operation significantly.

Preferably, a spring is provided for always pushing an operating rod inserted through a through hole up, or a lock mechanism is provided for having an operating rod stop at a predetermined position within a range of up/down movement of the operating rod. With such structure, an operating rod is normally kept popped-out for the ease of manipulation, while it can be shrunk for storage when it is out of use to avoid possible deformation. Also, the overall height of a load sensor may made lower.

In a still other embodiment, an elastic insulating resin substrate overlaid together for reinforcement with an elastic metal sheet is employed for the elastic board. Under such a structure, any desired combinations of the operating load—the output voltage property may be established easily by changing the material, shape, thickness etc. of the reinforcing sheet to be coupled with a certain substrate. Furthermore, because this makes it possible to use any of insulating resin materials in combination with any of elastic metal materials readily available in the market, an inexpensive load sensor may be offered.

DESCRIPTION OF THE PREFERRED EMBODIMENTS

Preferred embodiments of the present invention are described hereunder with reference to drawings. Those constituent parts having the same function as those in the conventional are represented by using the same symbols, and detailed descriptions of which are omitted here.

(Embodiment 1)

Figure 1:
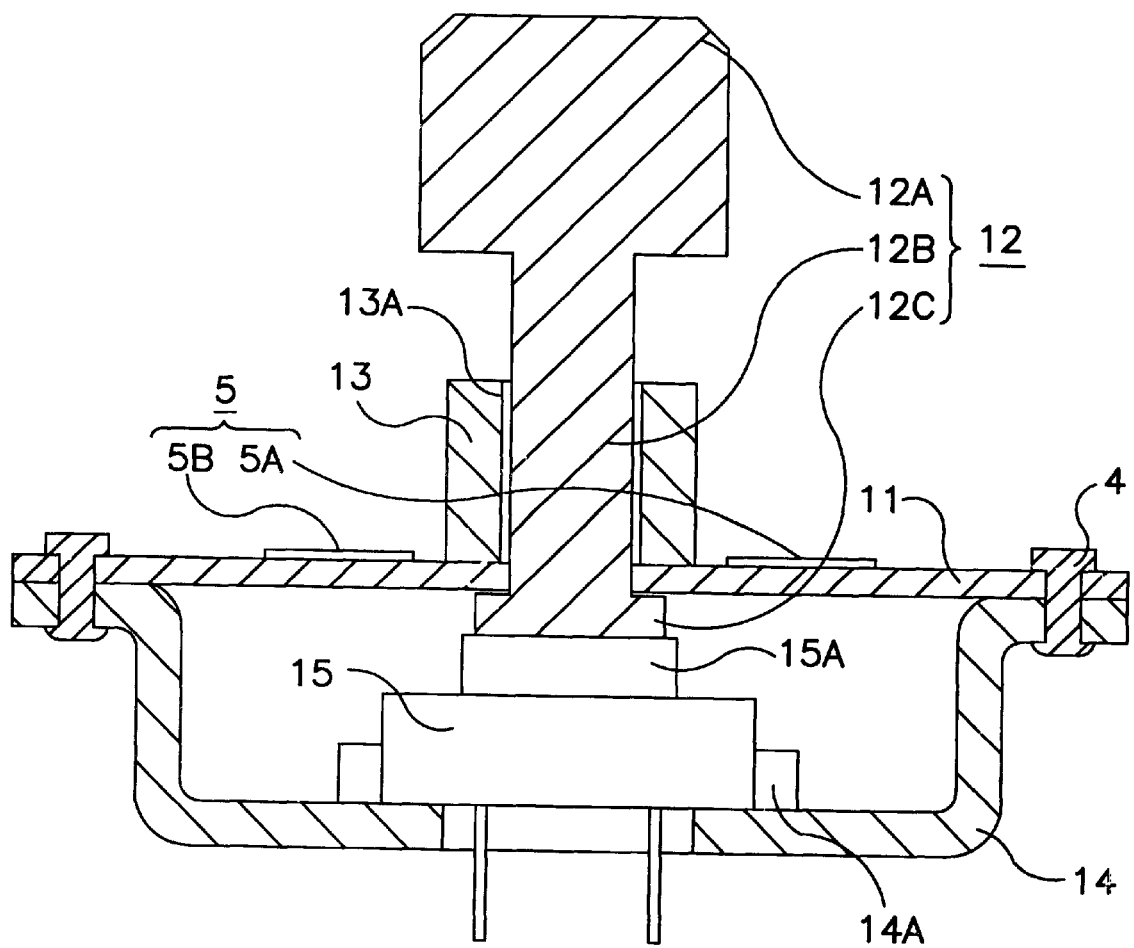
FIG. 1 is a cross sectional view showing a load sensor in accordance with a first embodiment of the present invention.
Figure 2:
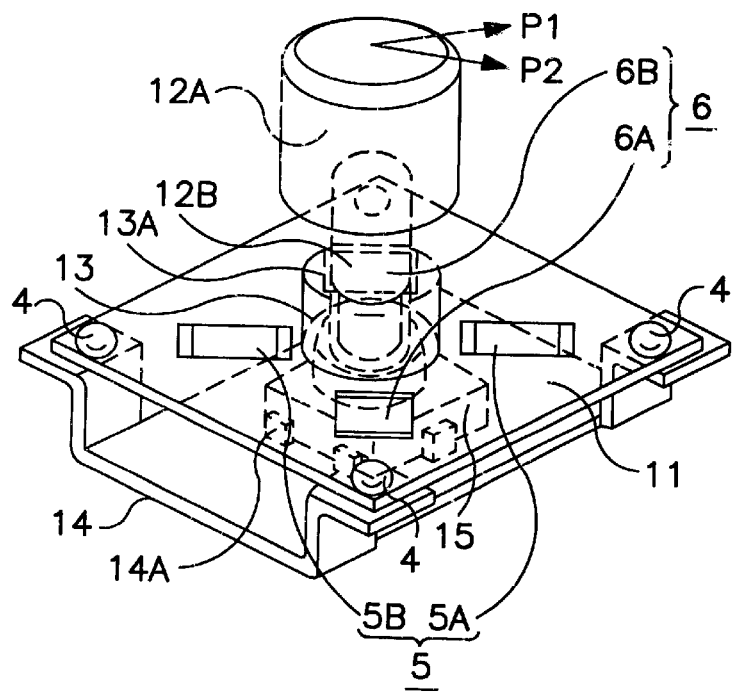
FIG. 2 is a perspective view showing appearance of the load sensor of FIG. 1.

In a load sensor in accordance with a first exemplary embodiment of the present invention as shown in FIG. 1 and FIG. 2, an elastic board 11 is fixed at four corners on a rigid base 14 by fixing members 4. Provided at the center of elastic board 11 is an operating part 13 which contains a through hole 13A. Fitting part 12B of an operating rod 12 is held by the through hole 13A to be movable ups and downs. Beneath the operating rod 12, an elastic trip-back type push-button switch 15 is fixed on the base 14 at a holding part 14A. On the elastic board 11, a first pair of strain detecting elements 5 (5A, 5B) and a second pair of strain detecting elements 6 (6A, 6B), both composed of strain-responsive resistor elements having a same resistance value, are provided respectively on lines connecting the fixing member 4 and the operating part 13 forming right angles to each other at a same distance from the operating part 13.

Figure 3:
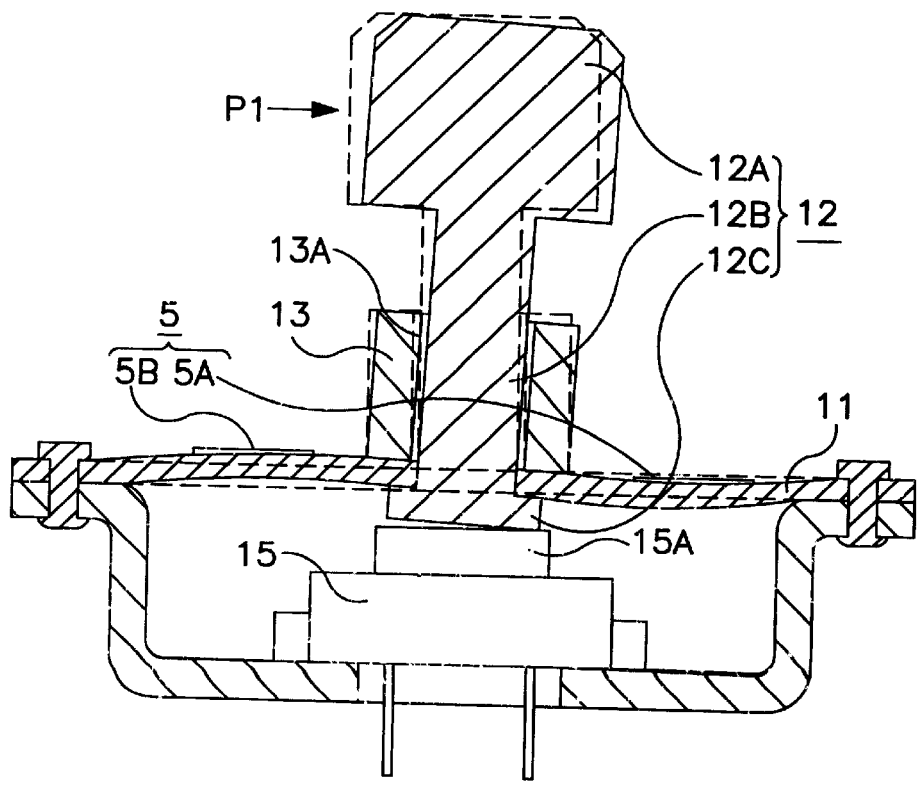
FIG. 3 is a cross sectional view showing a manipulation in the horizontal direction on the load sensor of FIG. 1.
Figure 4:
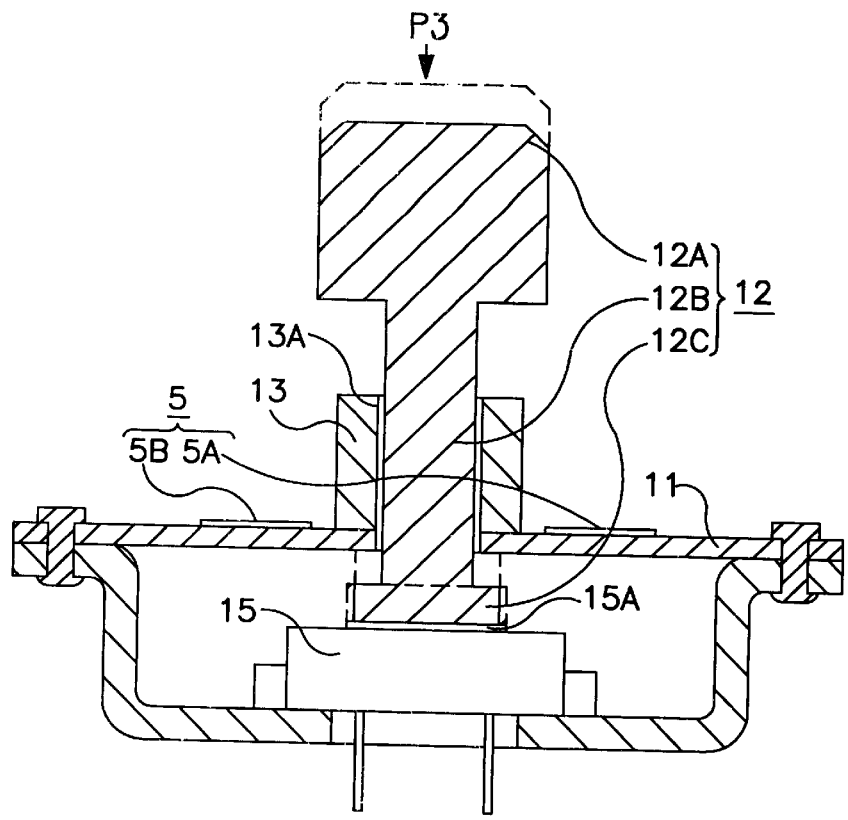
FIG. 4 is a cross sectional view showing a manipulation in the vertical direction on the load sensor of FIG. 1.

Operation of the load sensor is described referring to FIG. 3 and FIG. 4.

As shown in FIG. 3, when the operating rod 12 is given at the top end 12A with a force in the direction P1 that is parallel with elastic board 11 and going towards element 5A causing a tilted operating rod 12, the force is conveyed to elastic board 11 via operating part 13, because the fitting part 12B is fitted in the through hole 13A with a very small gap. As a result, one element 5A of the first pair of strain detecting element 5 is deformed to make a concave shape, while the other element 5B a convex shape. The deformation lowers the resistance value of element 5A, and raises the resistance value of element 5B. Through calculation of difference in the shift of resistance value between element 5A and element 5B, the shift of resistance value is doubled and outputted to represent the force applied to. In the mean time, the second pair of strain detection elements 6 (see FIG. 2) receive only torsional stress of a same direction, and no difference arises in the shift of resistance value. Therefore, only a force in the direction of coordinate axis of the first pair of strain detecting elements 5 is detected.

When the top end 12A is given with a force in the direction P2 that is parallel with elastic board 1 and going towards the middle point between element 5A and element 6A, the element 5A and element 6A make a concave deformation, while the element 5B and element 6B a convex deformation. As a result of the deformations, the resistance value of the elements 5A and 6A goes down, while that of elements 5B and 6B goes up. The difference in the shift of resistance value between element 5A and element 5B, and difference in the shift of resistance value between element 6A and element 6B are calculated respectively to compare the differences; and the strength and the direction of the force applied to are detected and outputted.

Thus the direction of move of top end 12A is detected in the form of ratio in the difference of resistance value shift between the first and the second pairs of strain detecting elements 5, 6; while the quantity of move of top end 12A is detected in terms of the large or the small of difference of resistance shift between the first and the second pairs of strain detecting elements 5, 6. When the operating rod 12 is tilted during horizontal manipulation, the bottom end 12C may push the button 15A of push-button switch 15 for a small quantity. However, an elastic restorative force provided for push button switch 15 prevents the switch from going into action.

As shown in FIG. 4, when the top end 12A is given with a pressing force in the direction P3 that is perpendicular to elastic board 11, the operating rod 12 which is fitted to be movable ups and downs at the fitting part 12B with the through hole 13A sinks down. The button 15A of push button switch 15 disposed on base 14 is pressed by the bottom end 12C of operating rod 12, and the push button switch 15 is put into action. As soon as the downward pressing force P3 exerted on top end 12A is removed, the button 15A is returned to initial position by the elastic restorative force of push-button switch 15, bottom end 12C is pushed up and the operating rod 12 too is returned to initial position.

As described above, in a load sensor in accordance with the Embodiment 1, the horizontal manipulation at the top end 12A of operating rod 12 may be detected through calculation of the difference in the shift of resistance value respectively in the first and the second pairs of strain detecting elements 5, 6, and the push-button switch 15 may also be operated by pushing the top end 12A down. In this way, both the transfer of coordinates on a display screen and the inputting may be conducted with the operating rod 12 only. A load sensor may thus be presented with which the operational convenience is significantly improved. Just for information, the resistance value of strain detecting elements 5, 6 do not shift because no force is applied on the elastic board 11 during the vertical manipulation.

It is preferred to use a click action switch for the push-button switch 15. This further enhances the operational advantage because the switching action is felt through the finger.

Although the strain detecting elements 5, 6 are disposed on the upper surface of elastic board 11 in the above descriptions, these elements may of course be disposed on the reverse surface of elastic board 11. Although a strain-responsive resistor element is formed on the elastic board 11 by a printing process for the elements 5A, 5B, 6A and 6B, a strain gauge may be mounted on the elastic board 11 for the same purpose. In the latter case, it is easy to comply with various elastic boards of diversified shapes and sizes. On the other hand, the strain-responsive resistor elements are advantageous in that the dislocation of position and the dispersion of resistance value are small with these elements, also the volume production is easier with these elements. Therefore, a load sensor of high detecting precision may be presented at an inexpensive price level.

(Embodiment 2)

Figure 5:
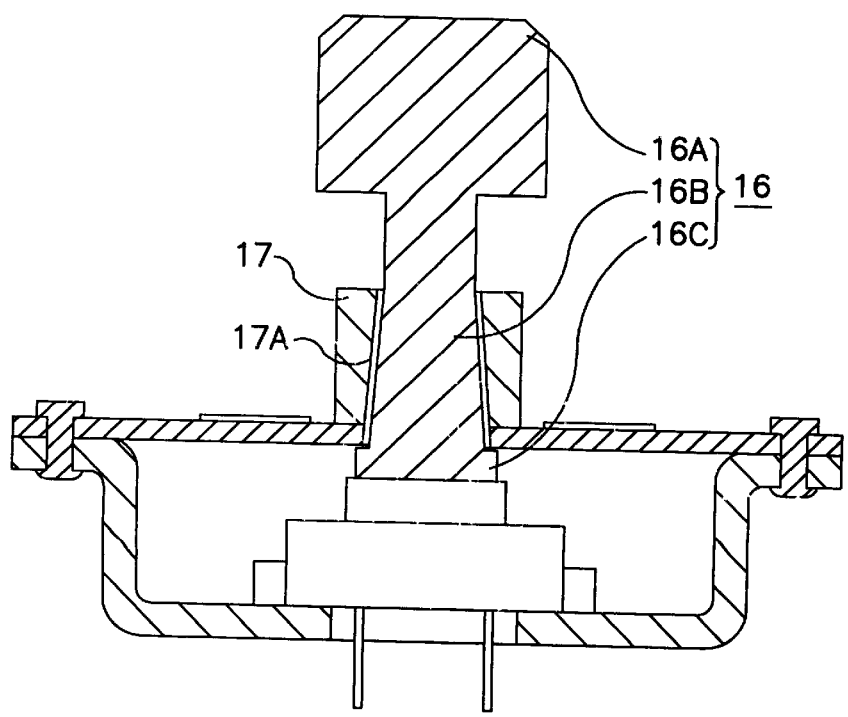
FIG. 5 is a cross sectional view showing a load sensor in accordance with a second embodiment of the present invention.

The point of difference with a load sensor of an exemplary embodiment 2 of the present invention, shown in FIG. 5, as compared with that of embodiment 1, is in the shapes of fitting part 16B of operating rod 16 and through hole 17A of operating part 17. Namely, the fitting part 16B has a tapered shape, going slimmer towards the top and thicker towards the bottom, and the through hole 17A is shaped accordingly.

Figure 6:
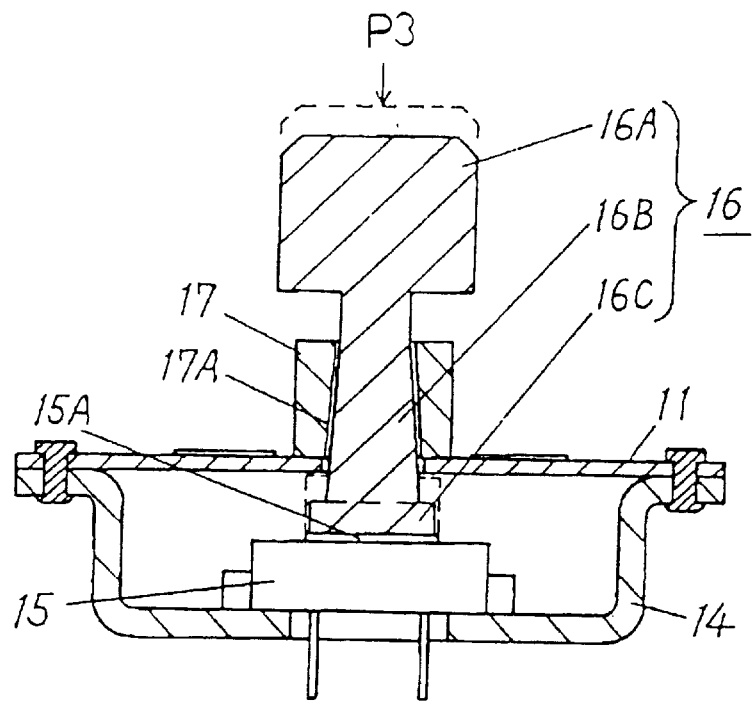
FIG. 6 is a cross sectional view showing a manipulation in the vertical direction on the load sensor of FIG. 5.

Operation of the load sensor is described with reference to FIG. 6. When a downward force is given on top end 16A of operating rod 16 in the direction P3 that is perpendicular to elastic board 11, the operating rod 16 is pushed down to press a button 15A with its bottom end 16C. A push-button switch 15 is thus put into action. When, the clearance between the fitting part 16B and the through hole 17A goes larger, making the operating part 17 and the elastic board 11 less affected by the motion of operating rod 16. Therefore, even if a horizontal force is given by mistake to the top end 16A during the operation on push-button switch 15, the force is least conveyed to the operating part 17 and a possibility for the strain detecting elements 5, 6 making erroneous action is reduced. While in the normal state, the operating rod 16 is kept in the initial position by the elastic restorative force of push-button switch 15, and the clearance between fitting part 16B and through hole 17A is small. Therefore, the play of operating rod is small.

In the above description, both of the fitting part 16B and the through hole 17A have a tapered shape. It is also possible that at least one of the fitting part 16B and the through hole 17A has a stepped form in which the diameter is smaller in the upper part and larger in the lower part.

(Embodiment 3)

Figure 7:
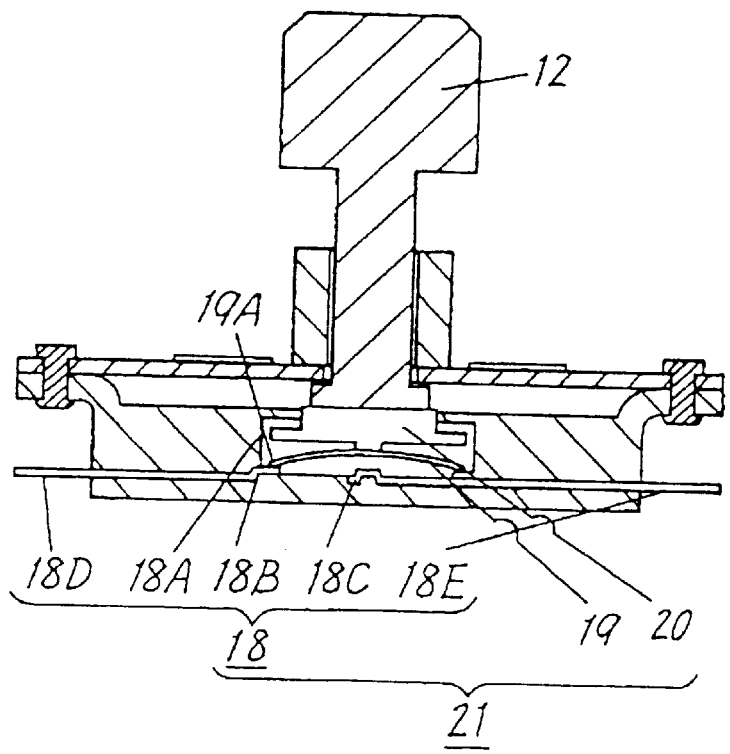
FIG. 7 is a cross sectional view showing a load sensor in accordance with a third embodiment of the present invention.

The point of difference with a load sensor of exemplary embodiment 3 of the present invention, shown in FIG. 7, as compared with that of embodiment 1, is in the structure of push-button switch. Namely, a push button switch 21 is composed of a base 18 of insulating material having a circular hollow 18A, at the bottom circumference of the circular hollow 18A an electro-conductive outer fixed-contact-point 18B is provided, and an electro-conductive central fixed-contact-point 18C at the center. On the outer fixed-contact-point 18B, a domed movable-contact-point 19 made of elastic thin metal sheet is provided with its circumferential edge 19A down, and an insulating button 20 on the movable-contact-point 19. When operating rod 12 is pressed and the button 20 is pushed down, the movable-contact-point 19 makes contact with the central fixed-contact-point 18C on the base 18, and an electrical signal is transmitted through electric signal output terminals 18D, 18E to a circuit of an electronic appliance.

By using the base 18 also as switch case of the push-button switch 21, the total number of constituent components, including the push-button switch, may be reduced. Thus a compact load sensor of lower height may be presented. The material cost of such sensors may be economical, and manufacturing of which may be easier too.

In the above description, the button 20 and the operating rod 12 are structured independent. It is also possible to form a button-less switch by structuring the button and the operating rod 12 as a one-piece member with an insulating material. By so doing, the total number of constituent components of a load sensor may be reduced.

(Embodiment 4)

Figure 8:
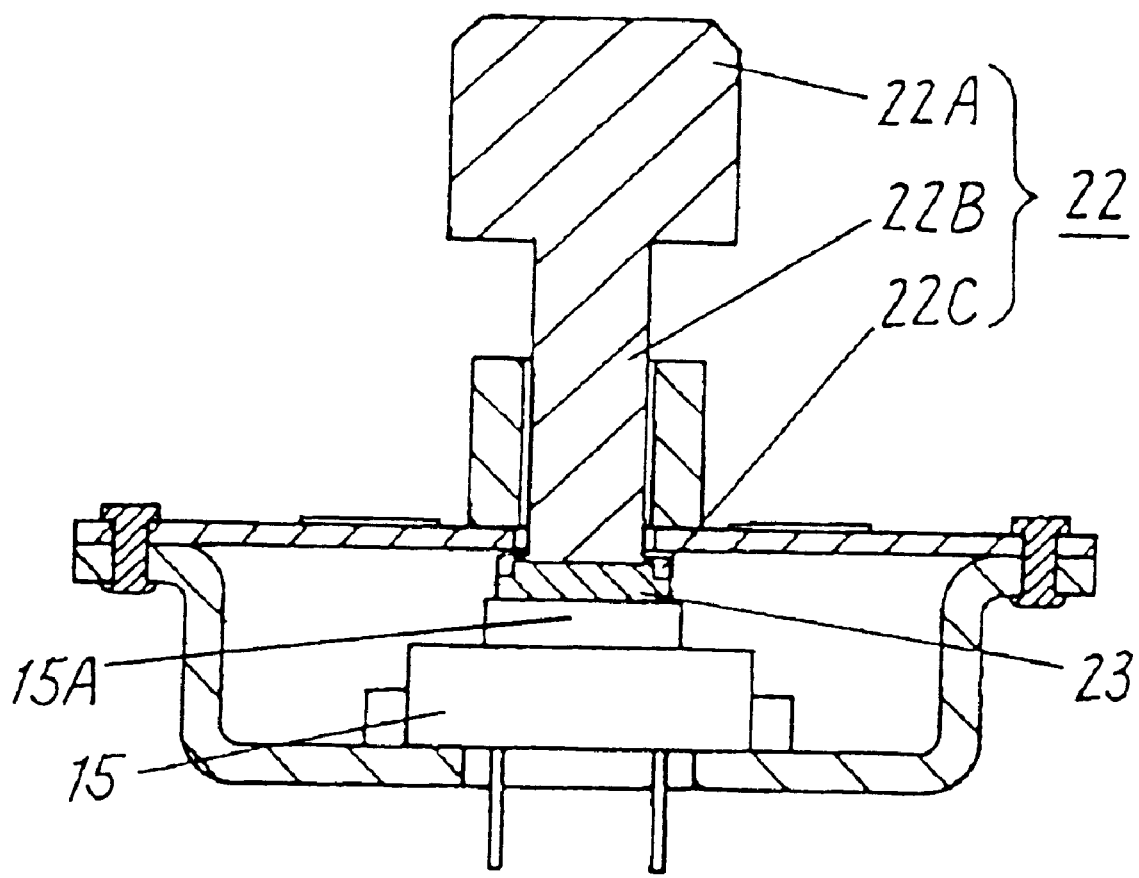
FIG. 8 is a cross sectional view showing a load sensor in accordance with a fourth embodiment of the present invention.

The point of difference with a load sensor of exemplary embodiment 4 of the present invention, shown in FIG. 8, as compared with that of embodiment 1, is that a buffer is disposed between the operating rod 22 and the button 15A in the present embodiment 4. A buffer 23 made of elastic material is placed between the bottom end 22C of operating rod 22 and the button 15A of the switch 15. By so doing, push-button switch 15 may be protected against deformation or breakage even when an unusually large downward shock is given on the top end 22A of operating rod 22.

In the above description, the button 15A and the buffer 23 are structured independent. It is also possible to form the button 15A with an insulating elastic material into a single member containing the function of buffer 23. By so doing, the same effects may be obtained with less number of constituent components.

(Embodiment 5)

Figure 9:
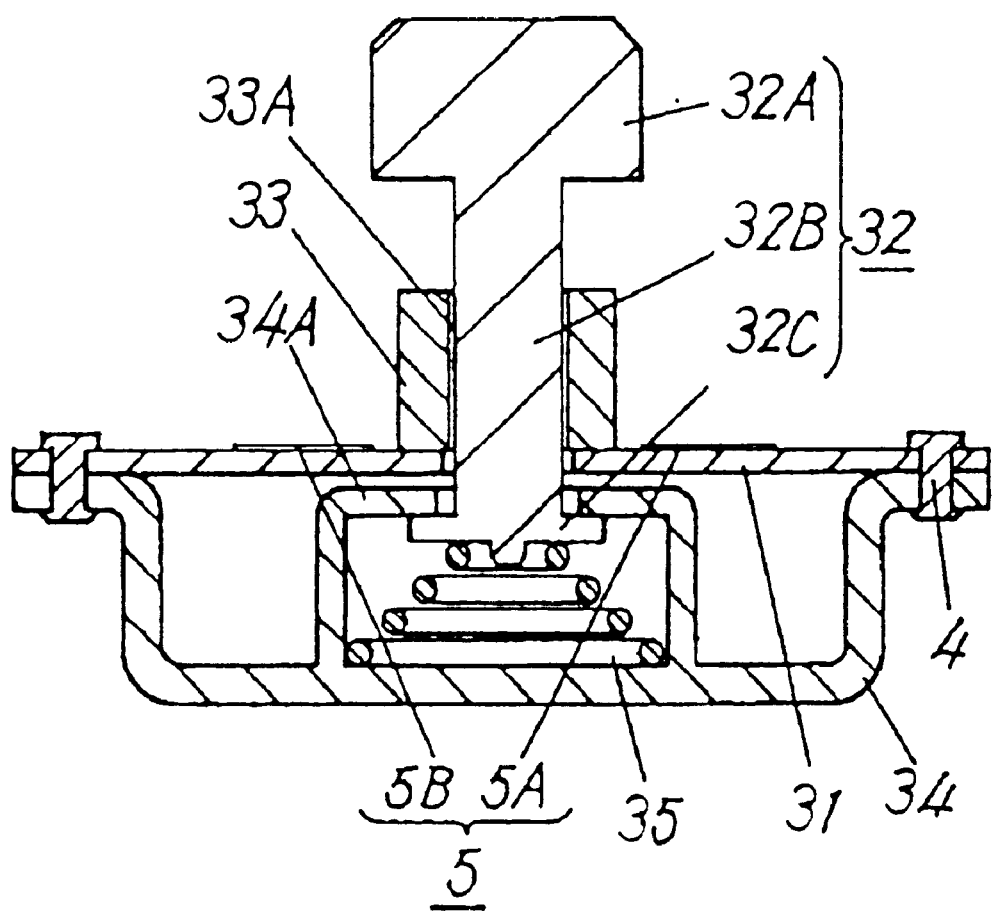
FIG. 9 is a cross sectional view showing a load sensor in accordance with a fifth embodiment of the present invention.
Figure 10:
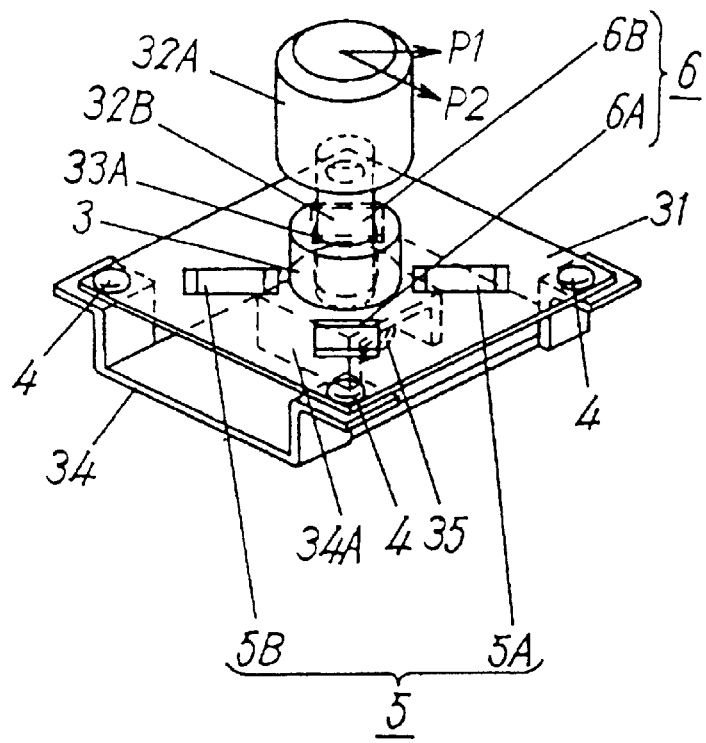
FIG. 10 is a perspective view showing appearance of the load sensor of FIG. 9.

In a load sensor in accordance with a fifth exemplary embodiment of the present invention as shown in FIG. 9 and FIG. 10, an elastic board 31 is fixed at four corners on a rigid base 34 with fixing members 4. Provided at the center of elastic board 31 is an operating part 33 which contains a through hole 33A. Fitting part 32B of an operating rod 32 is held by the through hole 33A to be movable ups and downs. Beneath the operating rod 32, a conical coil spring 35 made of elastic metal wire is provided on base 34 to push up a larger-diameter bottom end 32C of the operating rod 32 to upper stopper 34A of the base 34. On the elastic board 31, a first pair of strain detecting elements 5 (5A, 5B) and a second pair of strain detecting elements 6 (6A, 6B), both comprised of strain-responsive resistor elements having a same resistance value, are provided respectively on lines connecting the fixing members 4 and the operating part 33 forming right angles to each other at a same distance from the operating part 33.

Figure 11:
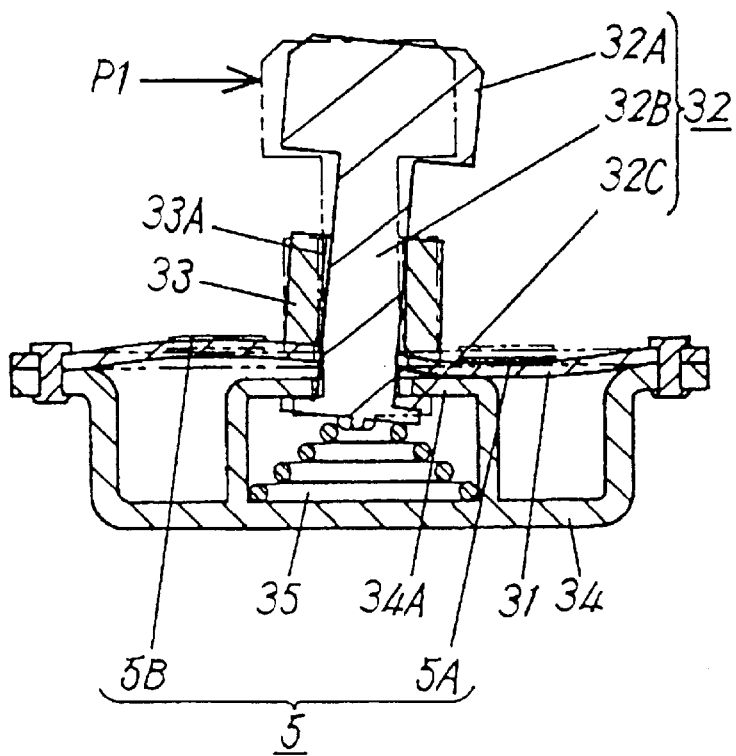
FIG. 11 is a cross sectional view showing a manipulation in the horizontal direction on the load sensor of FIG. 9.
Figure 12:
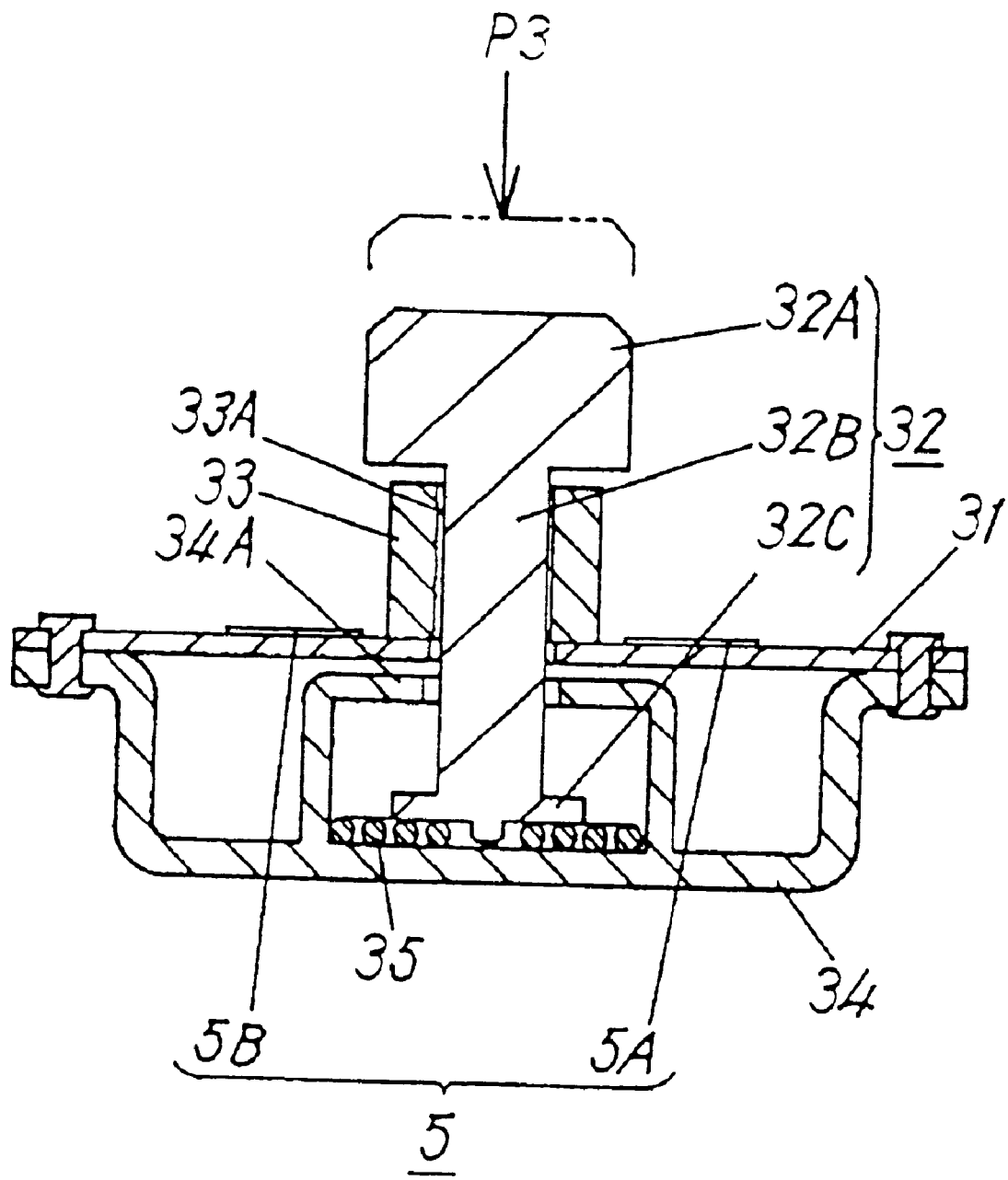
FIG. 12 is a cross sectional view showing a manipulation in the vertical direction on the load sensor of FIG. 9.

Operation of the load sensor is described referring to FIG. 11 and FIG. 12. When the operating rod 32 is given at the top end 32A with a force in the direction P1 that is parallel with elastic board 31 and going towards element 5A causing tilted operating rod 32, the force is conveyed to elastic board 31 via operating part 33 because the fitting part 32B is fitted in the through hole 33A with a very small gap. As a result, one element 5A of the first pair of strain detecting element 5 is deformed to make a concave shape, while the other element 5B a convex shape. The deformation lowers the resistance value of element 5A and raises the resistance value of element 5B. Through calculation of difference in the shift of resistance value between element 5A and element 5B, the shift of resistance value is doubled and outputted to represent the force applied to. In the mean time, the second pair of strain detection elements 6 (see FIG. 10) receive only torsional stress of a same direction, and no difference arises in the shift of resistance value. Therefore, only a force in the direction of coordinate axis of the first pair of strain detecting elements 5 is detected.

When the top end 32A is given with a force in the direction P2 that is parallel with elastic board 31 and going towards the middle point between element 5A and element 6A, the element 5A and the element 6A make a concave deformation, while the element 5B and the element 6B a convex deformation. As a result of these deformations, the resistance value of the elements 5A and 6A goes down, while that of elements 5B and 6B goes up. The difference in the shift of resistance value between element 5A and element 5B, and difference in the shift of resistance value between element 6A and element 6B are calculated respectively to compare the differences; and the size and the direction of the force applied to are detected and outputted.

Thus the direction of move of top end 32A is detected in the form of ratio in the difference of resistance value shift between the first and the second pairs of strain detecting elements 5, 6; while the quantity of move of top end 32A is detected in terms of the large or the small of difference of resistance shift between the first and the second pairs of strain detecting elements 5, 6. During the horizontal manipulation, or the operating rod 32 is tilted as a result, the bottom end 32C is pushed up by spring 35 to the upper stopper 34A; therefore, the operating rod 32 is kept protruded to the operating position.

If the top end 32A is given with a pressing force in the direction P3 that is perpendicular to elastic board 31, the operating rod 32 which is fitted to be movable ups and downs at the fitting part 32B with the through hole 33A sinks down, as shown in FIG. 12. As soon as the downward pressing force P3 exerted on top end 32A is removed, the bottom end 32C is pushed back by elastic restorative force of spring 35 to the upper stopper 34A, or to the operating position.

Figure 13A:
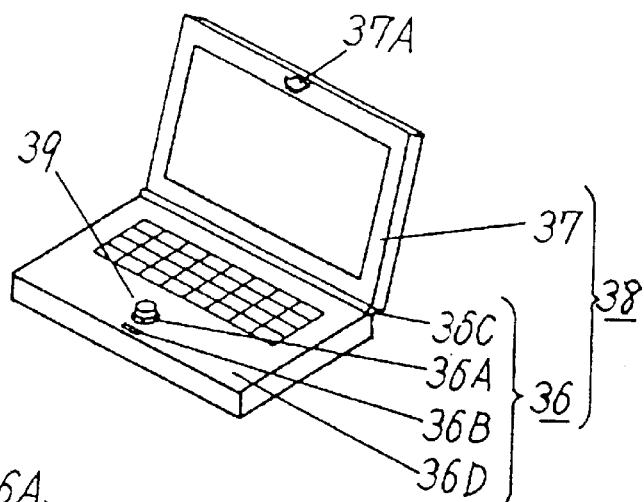
FIG. 13(a), FIG. 13(b) and FIG. 13(c) describe a pointing device incorporating the load sensor of FIG. 9; the respective drawings show a perspective view, a cross sectional view with lid open and a cross sectional view when the lid is closed.

Now in the following, description is made on a pointing equipment incorporating the load sensor, referring to FIG. 13(a)–FIG. 13(c).

A pointing equipment 38 incorporating the load sensor 39 is comprised of a case 36 having a round opening 36A to allow the operating rod 32 of load sensor 39 fixed on the operation panel 36D to pop out, and a lid 37 affixed to the case 36 with a hinge 36C. In order to enable the lid to be closed when out of service, a lock mechanism is provided, which is comprised of a claw 37A provided at the lid 37 and a square hole 36B provided at the case 36.

Figure 13B:
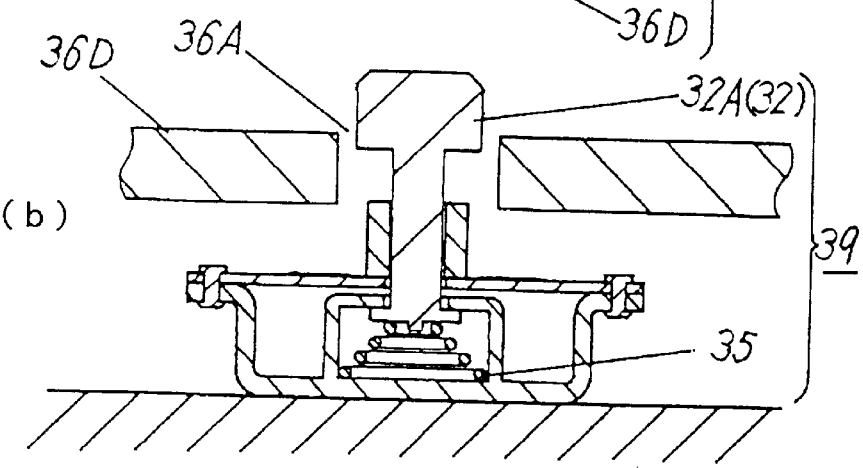
Figure 13C:
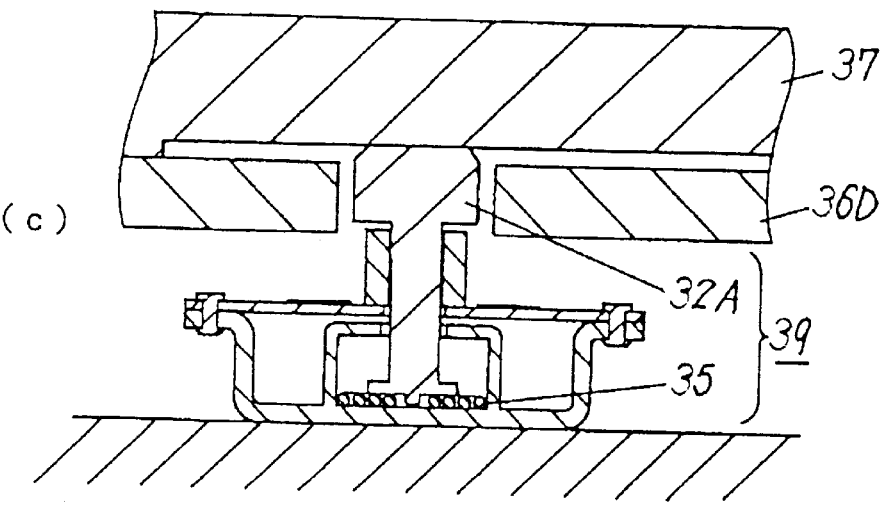

When the pointing equipment 38 is on service and the lid 37 is in open state, the operating rod 32 is pushed up by the elastic force of spring 35 disposed beneath the operating rod 32 and the top end 32A is protruding above the operation panel 36D for easy manipulation, as shown in FIG. 13(b). When it is out of service and the lid 37 is in closed state, the lid 37 touches on the operating rod 32 at the top end 32A to push down the operating rod 32, as shown in FIG. 13(c). Thus the lid 37 may be closed without any problem.

As described above, the operating rod 32 pops out for easy manipulation during use, and sinks down when out of use; therefore, the overall height may be reduced and a deformation trouble with the operating rod may also be avoidable. When a conical coil spring, among others, is used for the spring 35 the height at compression may become very small, which contributes to make an appliance thinner. In place of the conical coil spring 35, a cylindrical coil spring, a U-shape spring, leaf spring, etc. may of course be used for the same purpose.

Although the strain detecting elements 5, 6 are disposed on the upper surface of elastic board 31 in the present embodiment 5, these elements may of course be disposed on the opposite surface of elastic board 31. Although a strain-responsive resistor element has been formed on the elastic board 31 by a printing process for the elements 5A, 5B, 6A and 6B, a strain gauge may be mounted instead on the elastic board 31 for the same purpose. In the latter case, it is easy to comply with various elastic boards of diversified shapes and sizes. On the other hand, the strain-responsive resistor elements are advantageous in that the dislocation of position and the dispersion of resistance value are small with these elements, and volume production is easy too with these elements. Therefore, a load sensor of high detecting precision may be presented at an inexpensive price level.

Although in the above pointing device the lid 37 is connected to the case 36 at the hinge 36C, it may come in a sliding lid or a detachable lid.

(Embodiment 6)

Figure 14:
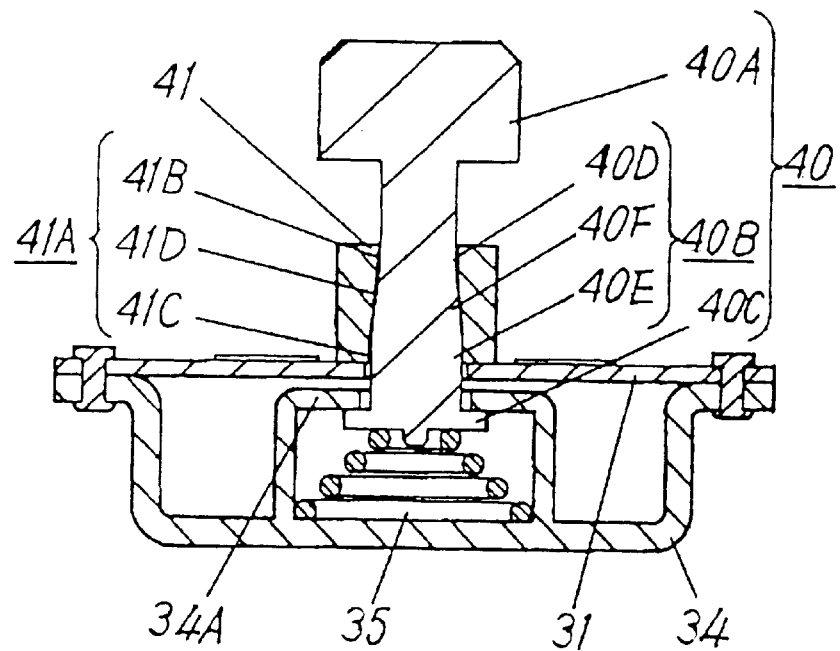
FIG. 14 is a cross sectional view showing a load sensor in accordance with a sixth embodiment of the present invention.

The point of difference with a load sensor of exemplary embodiment 6 of the present invention, shown in FIG. 14, as compared with that of embodiment 5, is in the shapes of fitting part 40B of operating rod 40 and through hole 41A of operating part 41. Namely, the fitting part 40B is comprised of a small-diameter part 40D in the upper part, a large-diameter part 40E in the lower part and a tapered part 40F in between the two parts. The through hole 41A of operating part 41 is also comprised of a small-diameter part 41B in the upper part, a large-diameter part 41C in the lower part and a tapered part 41D in between the two parts.

Figure 15:
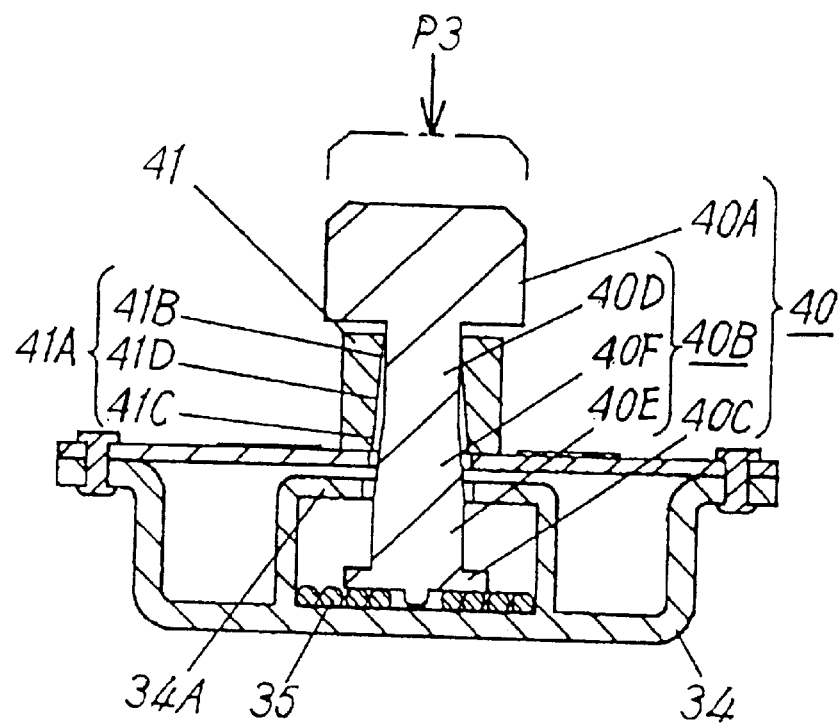
FIG. 15 is a cross sectional view showing a manipulation in the vertical direction on the load sensor of FIG. 14.

Operation of the load sensor is described with reference to FIG. 15. When a downward force is given on a top end 40A of operating rod 40 in the direction P3 that is perpendicular to elastic board 31, the operating rod 40 is pushed down and sinks lower. As soon as the downward force is removed, the bottom part 40C is pushed back by elastic restorative force of spring 35 to touch upper stopper 34A. When the operating rod 40 is in pressed-down state, the clearance between the fitting part 40B and the through hole 41A goes larger, making the operating part 41 and the elastic board 31 to be less affected by the motion of operating rod 40.

In the present exemplary embodiment 6, even if the operating rod 40 is pressed down in somewhat oblique direction, not exactly vertical, the operating rod 40 can easily be accepted down because the clearance between fitting part 40B and through hole 41A goes larger. While in the normal working state, the operating rod 40 is kept in the initial protruding position by the elastic restorative force of spring 35 and the clearance between fitting part 40B and through hole 41A is small. Therefore, the play of operating rod is small, making the load sensor easy to manipulate in the horizontal direction. The operational details in the horizontal direction remain the same as in the embodiment 5, and description of which is skipped here.

Besides the fitting structure between operating rod 40 and operating part 41 as described above, it may be constituted with only the tapered part 40F and the tapered part 41D, or by shaping at least either one of the fitting part 40B or the through hole 41A into a stepped form in which the diameter is smaller in the upper part and larger in the lower part for the same effect.

(Embodiment 7)

Figure 16:
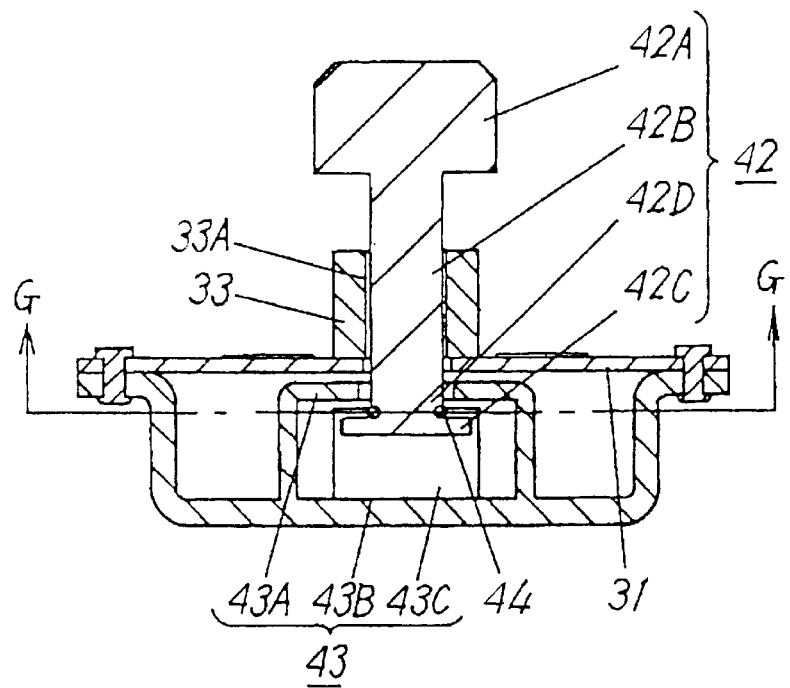
FIG. 16 is a cross sectional view showing a load sensor in accordance with a seventh embodiment of the present invention.
Figure 17:
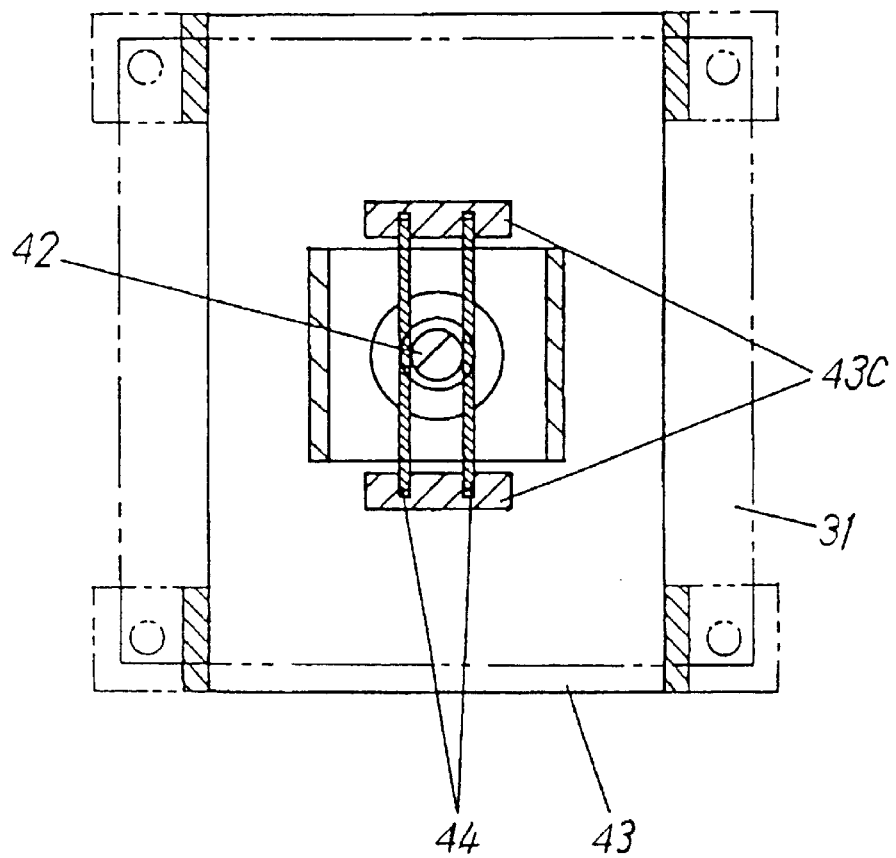
FIG. 17 is a cross sectional view at line G—G of FIG. 16.

The point of difference with a load sensor of exemplary embodiment 7 of the present invention, shown in FIG. 16 and FIG. 17, as compared with that of embodiment 5, is that there is a lock mechanism in the present embodiment which can hold an operating rod at a predetermined position within the range of up/down movement. Namely, the fitting part 42B of operating rod 42 is pinched at the fitting part 42B by a pair of parallel springs 44 comprised of elastic metal wires held by a pair of spring holding sections 43C on a base 43. Provided around the bottom end of fitting part 42B is a groove 42D, or a smaller diameter region. When the operating rod 42 is protruding, or in the working state, the parallel springs 44 are fitting with the groove 42D.

Operation of the load sensor is described in the following. Although the particulars in manipulating the operating rod 42 in horizontal direction remain the same as in embodiment 5, the operating rod 42 of the present embodiment can be kept at the protruding state, or the working state, in a stable manner even when it is tilted, because the parallel springs 44 are fitted with the groove 42D.

Figure 18:
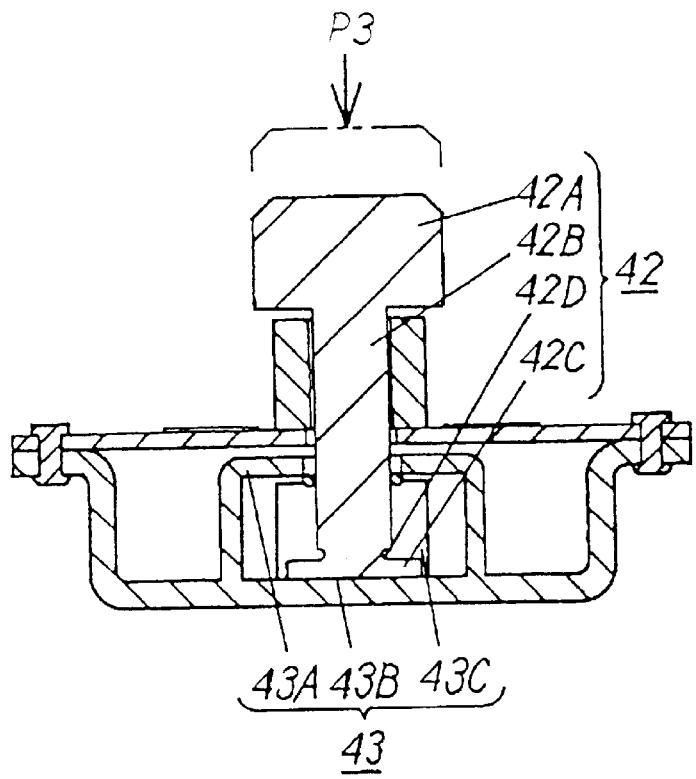
FIG. 18 is a cross sectional view showing a manipulation in the vertical direction on the load sensor of FIG. 16.

As to manipulation in the vertical direction, when the top end 42A is given with enough vertical force in the direction P3 that is perpendicular to elastic board 31 (a force stronger than the force engaging groove 42D with parallel springs 44), the engagement between groove 42D and parallel springs 44 is released, and the operating rod 42 is pushed down to touch the bottom stopper 43B of base 43 at the bottom end 43B, as shown in FIG. 18. When, the operating rod 42 is not shaky because it is held firmly between the parallel springs 44 at the fitting part 42B. When the top end 42A is pulled up the operating rod 42 goes up until touching to upper stopper 43A and the parallel springs 44 engage with the groove 42D. Then the operating rod 42 is ready for work.

Thus with the structure of embodiment 7, where the operating rod 42 is held between parallel springs 44, the operating rod 42 may not only be stopped and held at any desired height but it may be stopped without fail at the most protruding position and held firm by the engagement of parallel springs 44 with groove 42D.

Although in the above description the groove 42D is provided for only one place on the operating rod 42, it may be provided in pluralities for holding the operating rod 42 at any predetermined heights. The parallel springs 44 may be engaged with a step, instead of the groove 42D. Also, the parallel springs 44 may be formed with a single elastic metal wire shaped into the form of letter U, letter V, etc.

(Embodiment 8)

Figure 19:
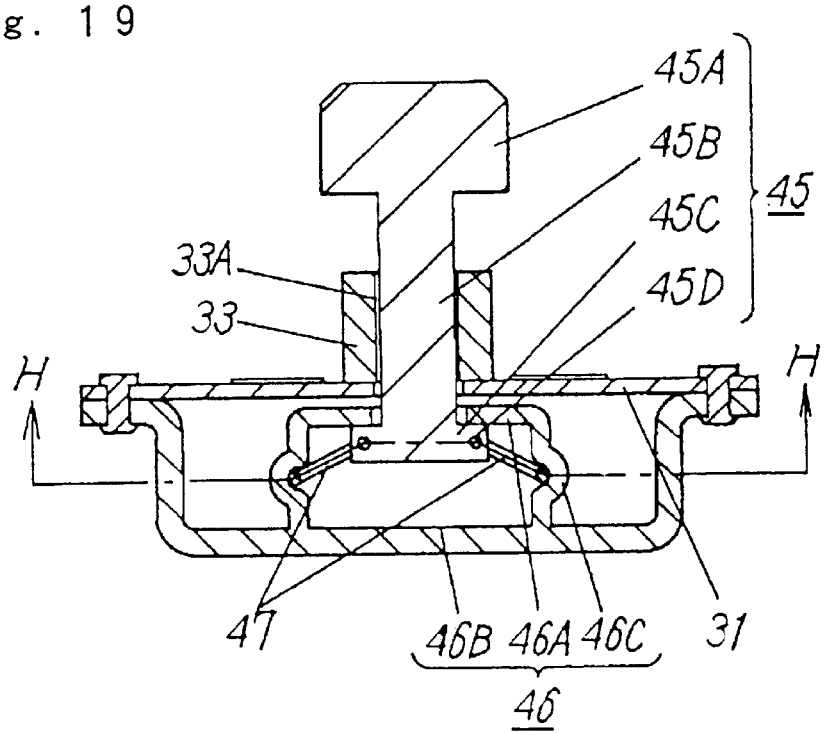
FIG. 19 is a cross sectional view showing a load sensor in accordance with an eighth embodiment of the present invention.
Figure 20:
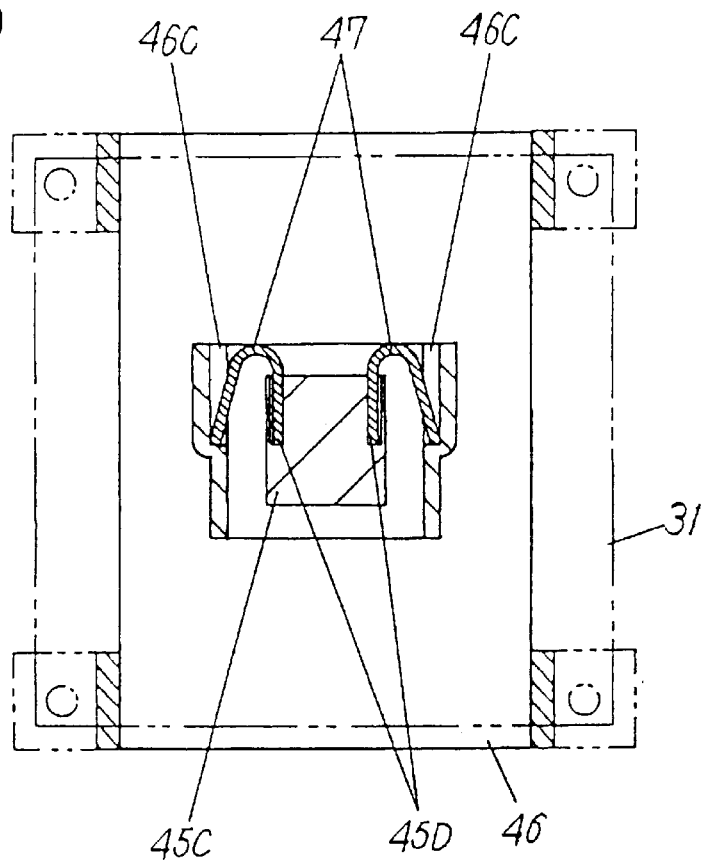
FIG. 20 is a cross sectional view at line H—H of FIG. 19.

The point of difference with a load sensor of exemplary embodiment 8 of the present invention, shown in FIG. 19 and FIG. 20, as compared with that of embodiment 7, is in the use of repulsion spring 47 provided between operating rod 45 and base 46 for the lock mechanism. Namely, a pair of spring holding sections 46C facing each other are provided as part of the base 46 at the middle point of up and down movement range of the bottom end 45C of operating rod 45, and a spring holding section 45D comprised of a pair of holes is provided at the bottom end 45C of fitting part 45B. A pair of U-shape repulsion springs 47 made of an elastic metal wire are provided revolvable between the spring holding sections 46C, 45D.

Operation of the load sensor is described in the following. The basics in horizontal manipulation of operating rod 45 remain the same as those described in embodiment 5. What is different is that when the operating rod 45 is tilted the bottom end 45C is pushed up by repulsion spring 47 to keep touching with the upper stopper 46A; as a result, the operating rod 45 can stably maintain the working state, or protruding state.

Figure 21:
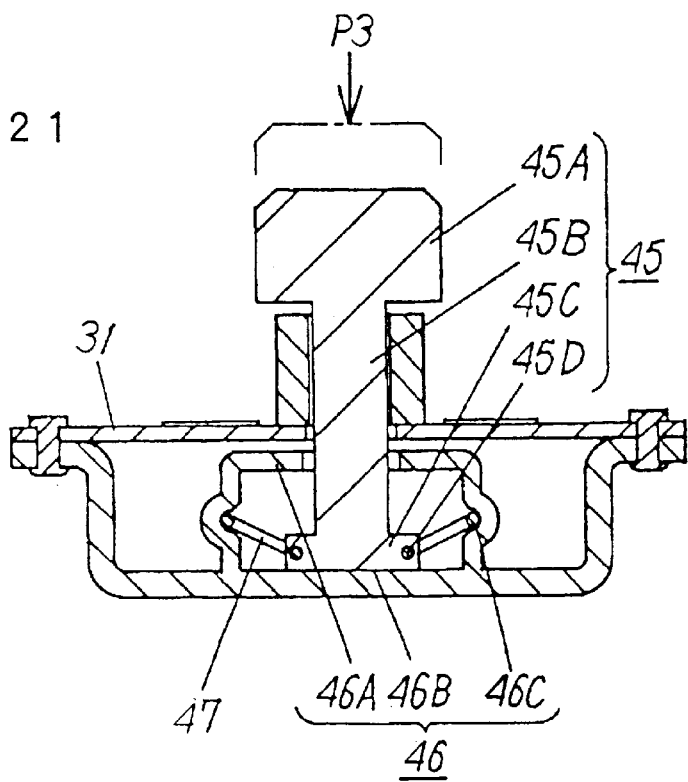
FIG. 21 is a cross sectional view showing a manipulation in the vertical direction on the load sensor of FIG. 19.

As shown in FIG. 21, for vertical manipulation of the operating rod 45, a downward force stronger than the push-up force of repulsion spring 47 is to be applied on the top end 45A in the direction P3 that is perpendicular to elastic board 31. After the spring holding section 45D of operating rod 45 passes through the level of spring holding section 46C of base 46, the force of repulsion spring 47 works for lowering the operating rod 45, bringing the bottom end 45C to touch the bottom stopper 46B of base 46. In the reverse way, when the top end 45A is pulled up the operating rod 45 goes up, as soon as the spring holding section 45D passes through the level of spring holding section 46C of base 46 the operating rod 45 is pushed up by the force of repulsion spring 47 until the bottom end 45C touches the upper stopper 46A. The operating rod 45 is thus set to be ready for work.

With the load sensor of present embodiment 8, the operating rod 45 may be held firm at the most protruded position or at the most pushed-in position by the action of upward force or downward force of the repulsion spring 47.

(Embodiment 9)

Figure 22:
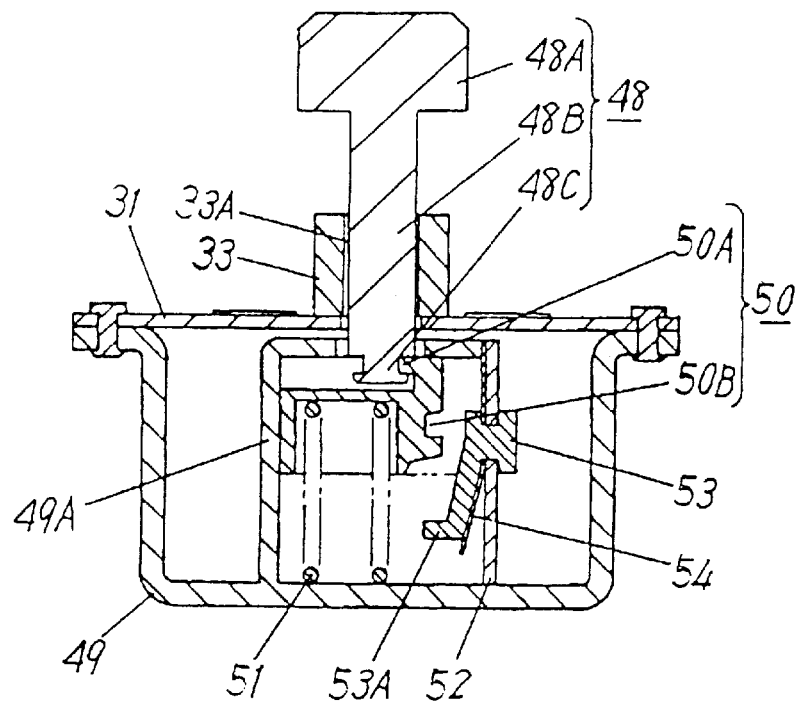
FIG. 22 is a cross sectional view showing a load sensor in accordance with a ninth embodiment of the present invention.
Figure 23:
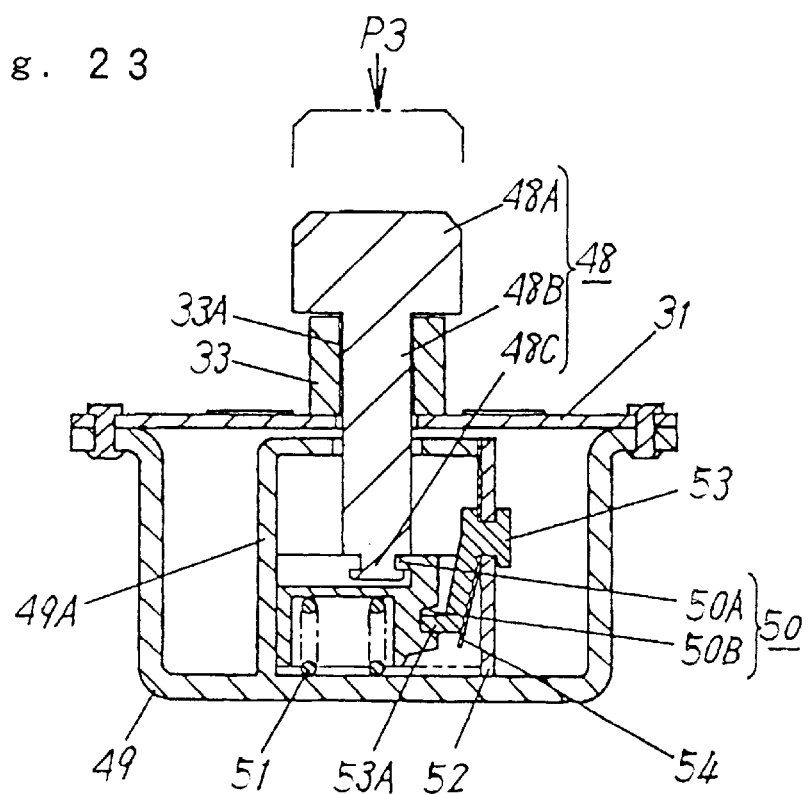
FIG. 23 is a cross sectional view showing a manipulation in the vertical direction on the load sensor of FIG. 22.

The point of difference with a load sensor of exemplary embodiment 9 of the present invention, shown in FIG. 22 and FIG. 23, as compared with that of embodiment 7, is that the present embodiment comprises a lock mechanism that locks and releases a heart-shaped hollow 50B of lock body 50 with a pin 53A of cam 53. Namely, a lock body 50 is housed within a box-shape cover 49A formed as a part of base 49, and a coil spring 51 for pushing the lock body 50 upward is provided between the lock body 50 and the bottom wall of box-shape cover 49A. A recess 50A provided at an end of lock body 50 is engaged with a groove 48C provided at the bottom end of fitting part 48B of operating rod 48 having a top end 48A. On a lid 52 of the box-shape cover 49A is a cam 53 having a round pin 53A at an end, which is disposed revolvable and provided with a leaf spring 54 for pressing the pin 53A towards inside. The hollow 50B and the pin 53A are engaged or released along with the up and down motion of lock body 50 caused as a result of up and down movement of operating rod 48; FIG. 22 shows released state and FIG. 23 engaged state.

As described above, repetition of push-in action on operating rod 48 brings it, and fixes, to a protruding state (lock being released), or working state, and a withheld state (push-locked), or off-duty state, in turn.

(Embodiment 10)

Figure 24:
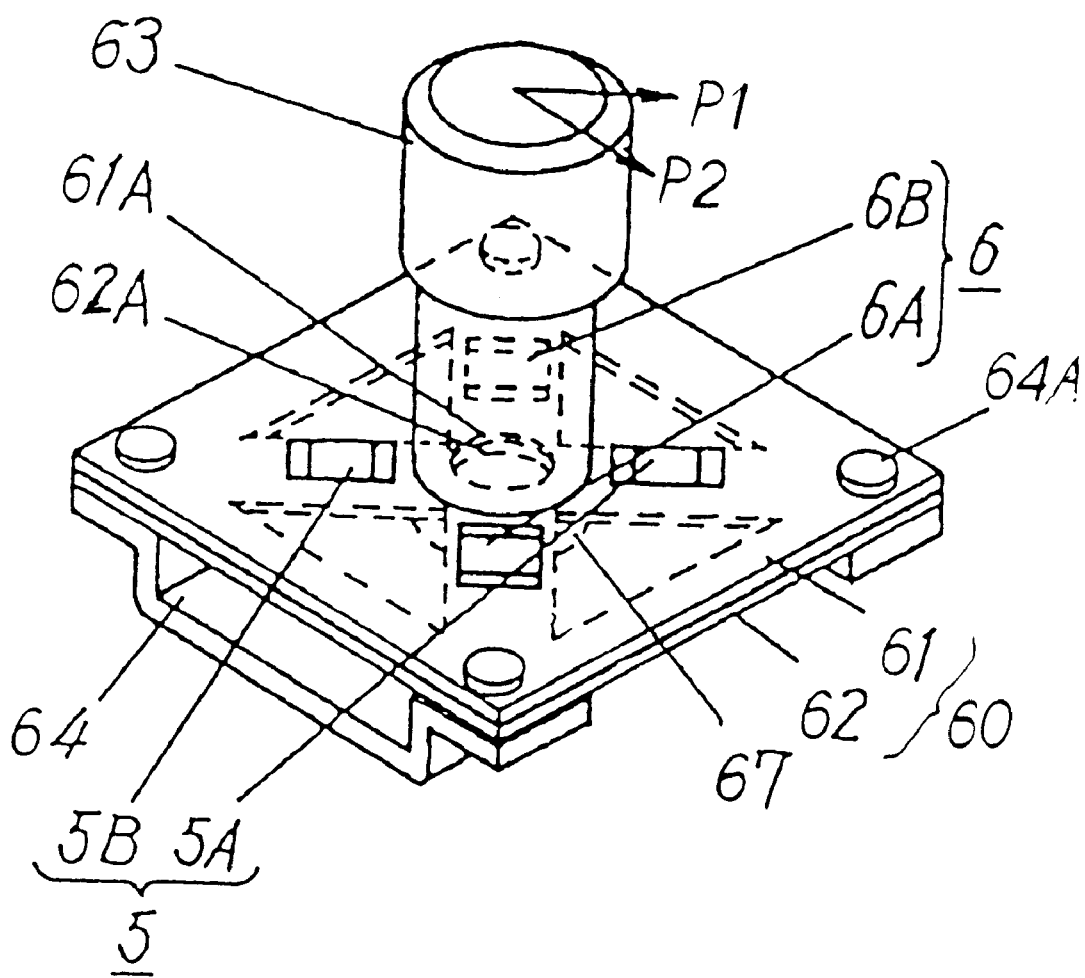
FIG. 24 is a perspective view showing appearance of a load sensor in accordance with a tenth embodiment of the present invention.
Figure 25:
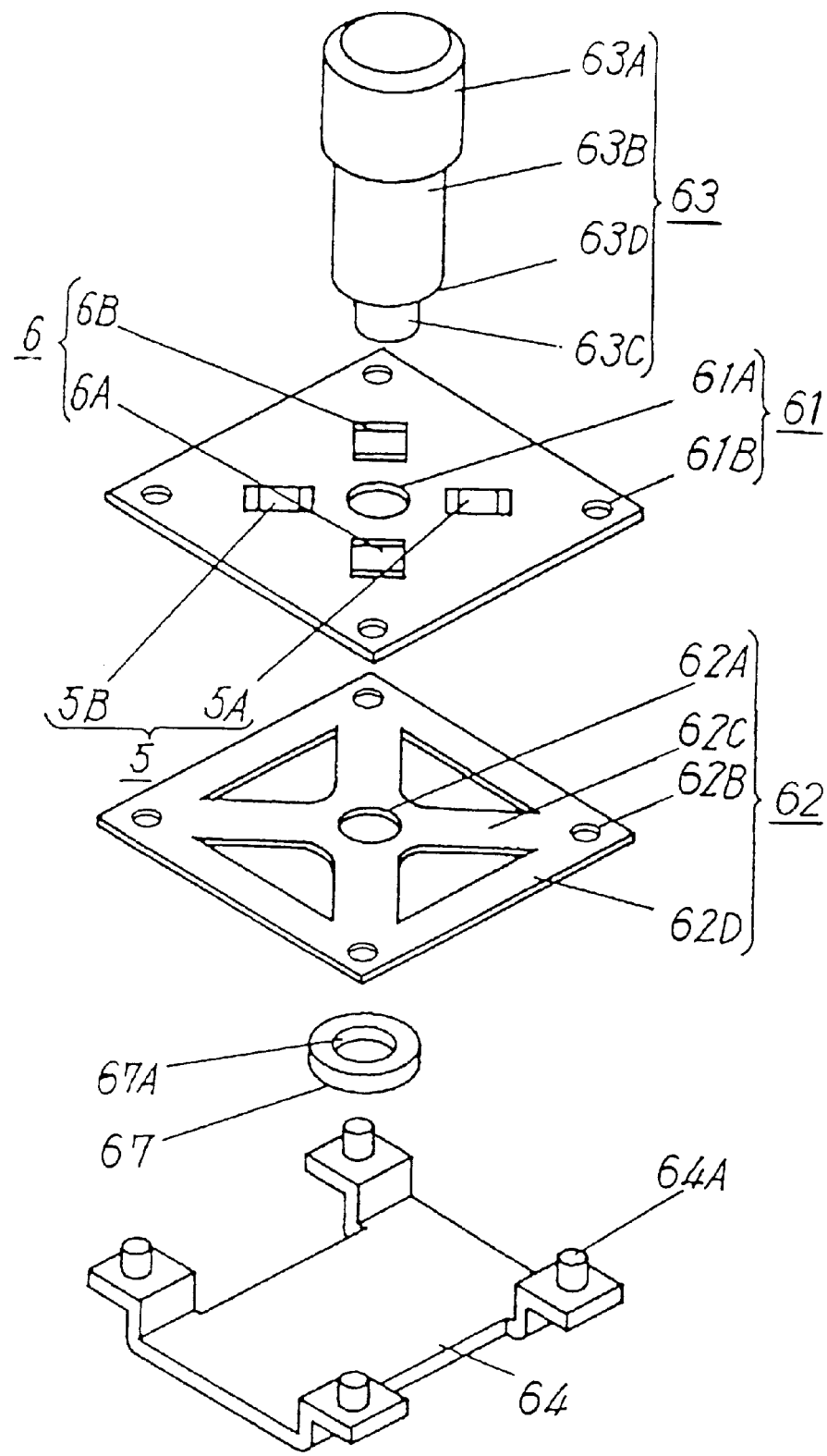
FIG. 25 is an exploded perspective view showing the load sensor of FIG. 24.
Figure 26:
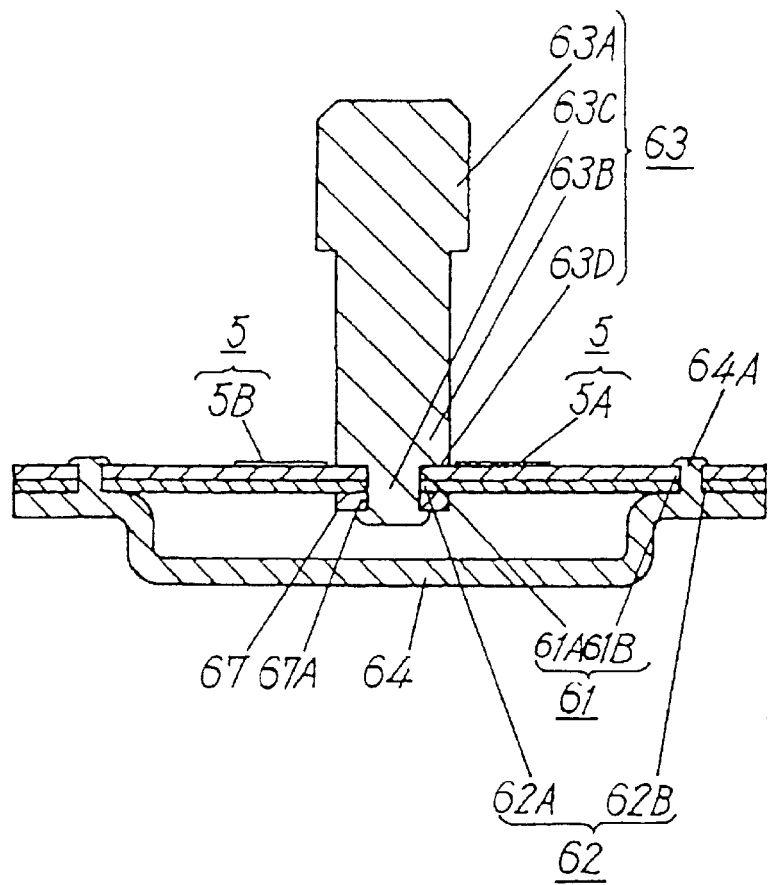
FIG. 26 shows a cross sectional front elevation view of the load sensor of FIG. 24.

In a load sensor in accordance with a tenth exemplary embodiment of the present invention, as shown in FIG. 24, FIG. 25 and FIG. 26, an elastic board 60 is comprised of an elastic insulating resin substrate 61 and an elastic metal reinforcing sheet 62. In each of the substrate 61 and the reinforcing sheet 62, a small hole 61B, 62B is provided respectively at four corners. These small holes 61B, 62B are aligned to corresponding fixing pins 64A provided extruding from a base 64 at the four corners, and then the fixing pins 64A are caulked at the upper end. In this way, the substrate 61 and the reinfocing sheet 62 are overlaid together and fixed on the base 64.

A rigid operating rod 63 is comprised of an upper manipulating part 63A, a round large-diameter part 63B in the middle and a bottom concentric small-diameter part 63C. The small-diameter part 63C is inserted through the holes 61A, 62A provided respectively at the center of substrate 61 and reinfocing sheet 62, and then further fitted to a through hole 67A of ring-shape washer 67. The outer diameter of washer 67 is almost identical to that of the large-diameter part 63B. By caulking the bottom end of operating rod 63, the substrate 61 and the reinfocing sheet 62 are fixed together with the washer 67.

On the surface of substrate 61, a first and a second pairs of strain detecting elements 5 (5A, 5B), 6 (6A, 6B) are formed respectively on the lines connecting the fixing pin 64A and the operating rod 63 forming right angles to each other, at a same distance from the operating rod 63 and close to bottom edge 63D of the large-diameter part 63B touching the substrate 61. These elements 5A, 5B, 6A and 6B are strain-responsive resistor elements formed by a printing process, each having a same resistance value.

The reinfocing sheet 62 disposed underneath the substrate 61 is comprised of bridges 62C having a predetermined width disposed on the lines connecting the fixing pin 64A and the operating rod 63 perpendicular to each other and an outer frame 62D connected to the bridges 62C.

Figure 27:
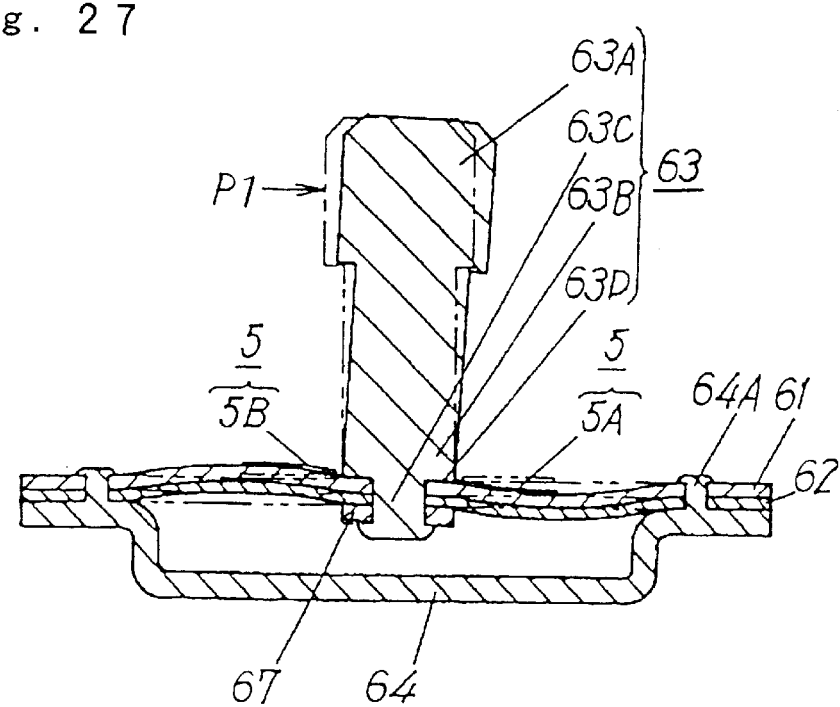
FIG. 27 is a cross sectional front elevation view of the load sensor of FIG. 24, used to explain the operation.

Operation of the load sensor is described in the following, referring to FIG. 27. When the manipulating part 63A of operating rod 63 is given with a force in the direction P1 that is parallel with the substrate 61 and going towards element 5A, both the substrate 61 and the reinfocing sheet 62 make elastic deformation as the two items are firmly fixed together by the bottom surface of large-diameter part 63B of operating rod 63 and the washer 67. Among the first pair of strain detecting elements 5 formed on substrate 61, element 5A is deformed into a concave shape, while element 5B into a convex shape; the resistance value goes down with the element 5A and goes up with the element 5B. Through calculation on difference in the shift of resistance value between the elements 5A and 5B, the load applied to is detectable. In the above method of detection, the strain quantity is the largest in an area at which the bottom edge 63D of large-diameter part 63B touches on the surface of substrate 61, at the same time the load concentrates on the bridges 62C of reinfocing sheet 62. Therefore, a large output voltage may be obtained with good response.

Meanwhile, the second pair of strain detecting elements 6 receive only torsional stress of a same direction, and no difference arises in the shift of resistance value. Therefore, only a force in the direction of coordinate axis of the first pair of strain detecting elements 5 is detected.

When the manipulating part 63A is given with a force in the direction P2 that is parallel with elastic board 61 and going towards the middle point between element 5A and element 6A, the element 5A and the element 6A make a concave deformation, while the element 5B and the element 6B a convex deformation. As a result of these deformations, the resistance value of the elements 5A and 6A goes down, while that of elements 5B and 6B goes up. The difference in the shift of resistance value between element 5A and element 5B, and difference in the shift of resistance value between element 6A and element 6B are calculated respectively to compare the differences; and the strength and the direction of the force applied to are detected and outputted. In the above method of detection, as the substrate 61 made of elastic insulating resin easily makes deformation with a far smaller force than in the reinfocing sheet 62 made of elastic metal sheet, the load is concentrated on the bridges 62C of reinfocing sheet 62 alike the case when a load is given in the direction P1. Therefore, in the present case where a load is given in the direction P2, the strain detecting elements 5, 6 receive a largest strain, and a stable operating load—output voltage relationship is obtainable.

As described in the above, a load sensor in accordance with the present exemplary embodiment 10 detects at high sensitivity the direction and strength of the force with the first and the second pairs of strain detecting elements 5, 6 in whichever direction the manipulating part 63A of operating rod 63 is moved. Thus the operating load—output voltage relationship is obtainable with high stability. By selecting desired material, shape, thickness, etc. for the reinfocing sheet 62, a targeted load—output voltage relation may be established easily. Because insulating resin materials and metal materials readily available in the market are usable for the load sensor in accordance with the present exemplary embodiment 10, the cost of load sensor may be reduced. Furthermore, because the substrate 61 and the reinfocing sheet 62 may be fixed together firmly by the operating rod 63 and the washer 67 in a structure in accordance with the present embodiment, the operating rod may have least play, and an excellent response may be obtained.

Although in the present embodiment bridges 62C having a certain width and an outer frame 62D are connected together to form a reinfocing sheet 62, the outer frame 62D may be eliminated to have the end part of bridges 62C fixed direct on the fixing pin 64A of base 64 together with the substrate sheet 61. Or, the outer frame 62D and the bridges 62C may be formed on a single flat sheet. It is also possible to form the manipulating part 63A with a same diameter as that of the large-diameter part 63B, and the washer 67 with a diameter smaller than that of the large-diameter part 63B.

A strain gauge may be used for the strain detecting elements 5, 6. In this case, it is easy to comply with various elastic boards of diversified sizes and shapes. When a strain-responsive resistor element is employed, it is advantageous in that the dislocation of position and the dispersion of resistance value are small, and the volume production is easy with the element. Therefore, a load sensor of high detecting precision may be presented at an inexpensive price level.

It is also possible to reverse the overlaid substrate 61 and reinfocing sheet 62 together as they are, fix them on the base 64, and provide strain detecting elements 5, 6 on the surface of the reversed substrate 61 at the vicinity of outer circumference of the washer 67.

(Embodiment 11)

Figure 28:
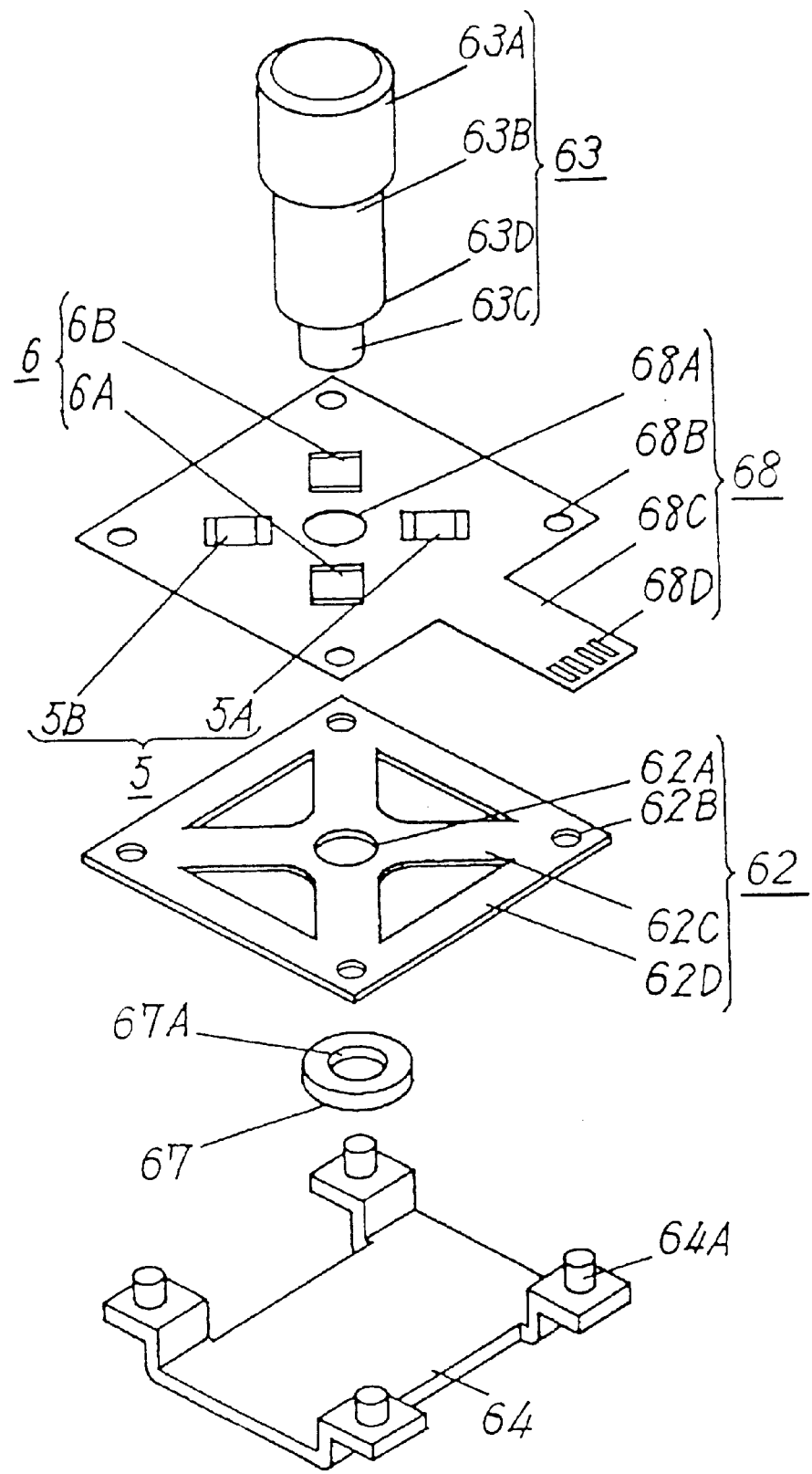
FIG. 28 is an exploded perspective view showing a load sensor in accordance with an eleventh embodiment of the present invention.
Figure 29:
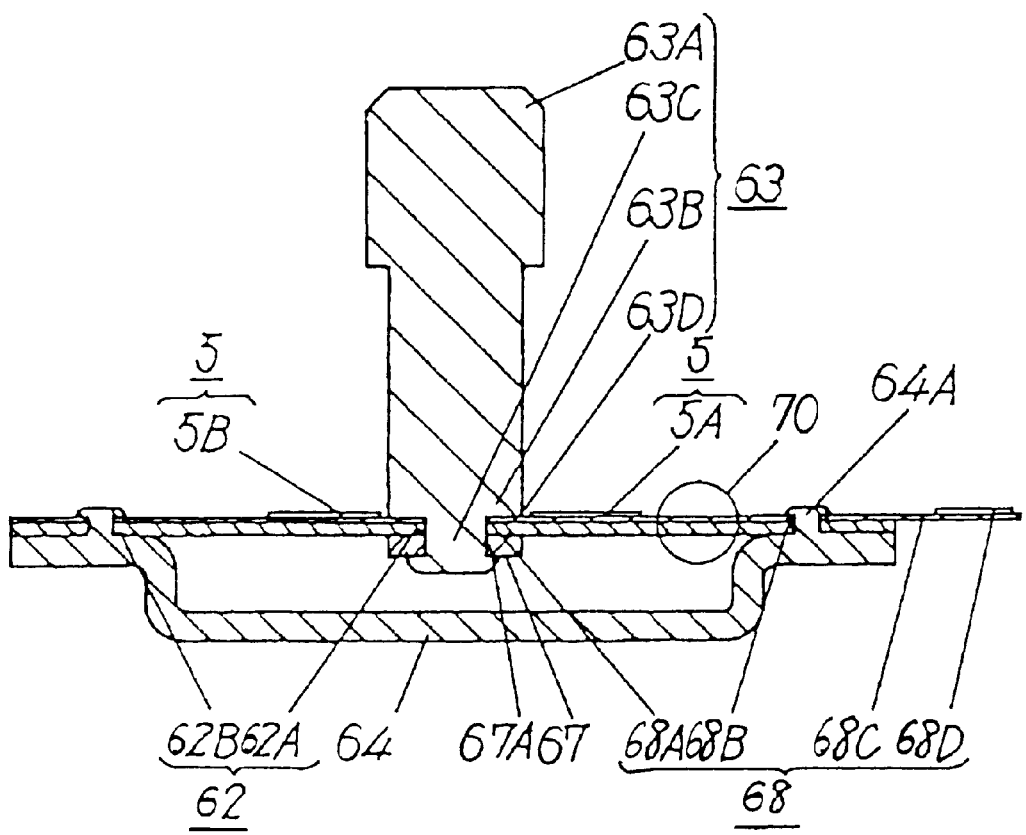
FIG. 29(a) is a cross sectional front elevation view of the load sensor of FIG. 28.
FIG. 29(b) is an enlargement of the encircled part of FIG. 29(a).
Figure 29:
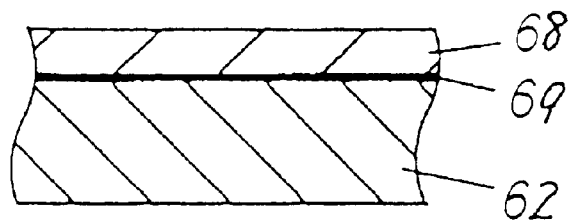
Figure 30:
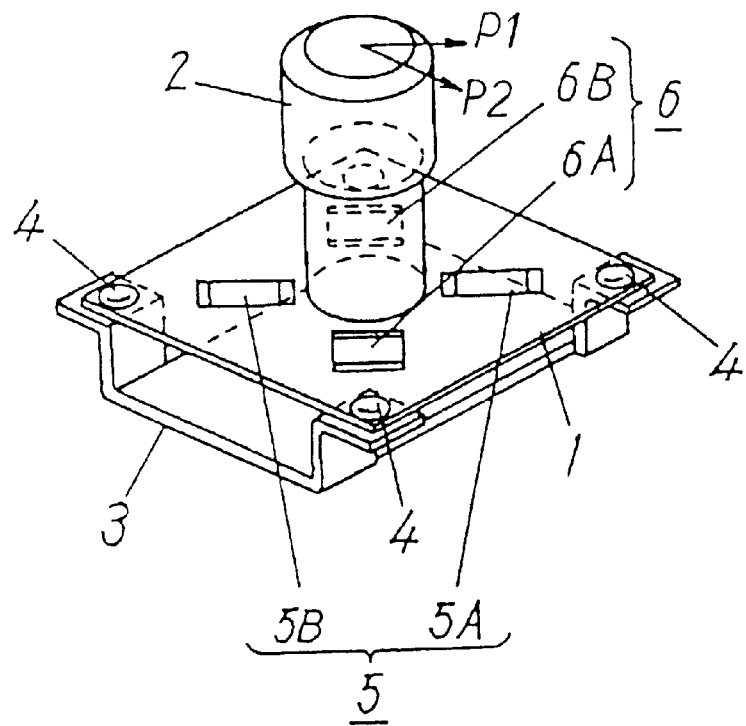
FIG. 30 is a perspective view showing appearance of a conventional load sensor.
Figure 31:
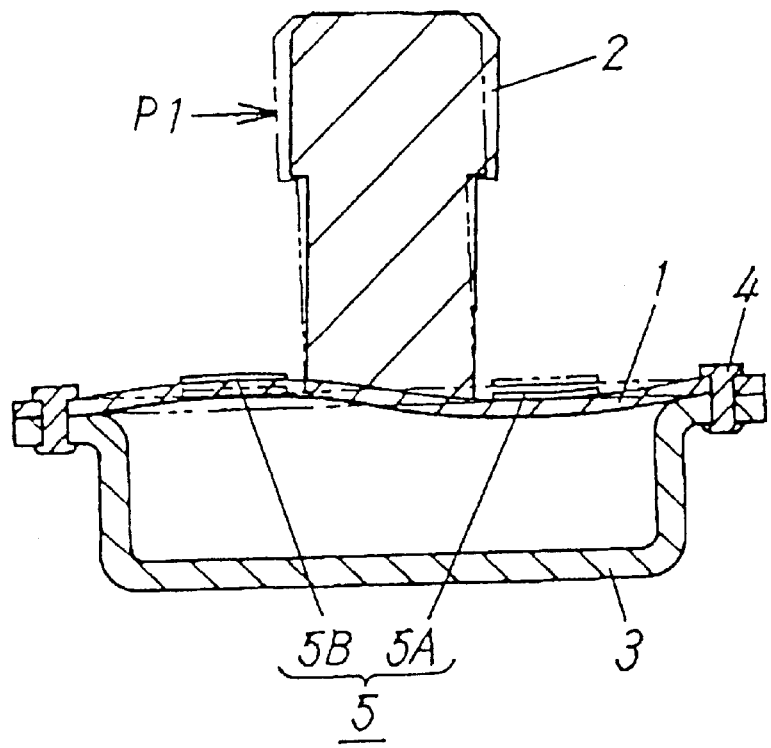
FIG. 31 is a cross sectional view showing the conventional load sensor of FIG. 30 at work.

The point of difference with a load sensor of exemplary embodiment 11 of the present invention, shown in FIG. 28, FIG. 29(a) and FIG. 29(b), as compared with that of embodiment 10, is that the present embodiment employs a flexible substrate 68 for the substrate. The flexible substrate 68 is provided with a hole 68A at the center, small holes 68B at four corners, a terminal part 68C at a side for leading output signals outside, and a circuit pattern 68D. The flexible substrate 68 is overlaid and glued on reinfocing sheet 62 with a glue 69 made of a thermo-setting resin as the main ingredient, as shown in FIG. 29(b), which being a magnification of the encircled part 70 of FIG. 29(a), with the hole 68A and small holes 68B aligned to the corresponding hole 62A and small holes 62B. As the glue 69 has a well developed three-dimensional reticulated structure, it shows a least plastic deformation. Therefore, the hysteresis in the operating load—output voltage relationship is small, and less influenced by the temperature and other environmental factors.

These small holes 68B, 62B of the flexible substrate 68 and reinfocing sheet 62 glued together are aligned to and fixed on corresponding fixing pins 64A of the base 64, and the hole 68A and hole 62A are clamped together by the bottom surface of large-diameter part 63B of operating rod 63 and washer 67. A first and a second pairs of strain detecting elements 5 (6A, 5B), 6 (6A, 6B) are formed close to bottom edge 63D of the large-diameter part 63B on flexible substrate 68.

When manipulating part 63A is given with a force the bridges 62C of reinfocing sheet 62 makes elastic deformation to be conveyed to the flexible substrate 68 which is fixed on reinfocing sheet 62 with glue 69, the strain is conducted to the first and the second pairs of strain detecting elements 5, 6, to shift the resistance value. Through calculation of the difference, the strength and the direction of load applied to operating rod 63 are detected.

With the present exemplary embodiment 11, compact and highly reliable load sensors may be offered employing a reduced number of constituent components, because a terminal part 68C for leading the electrical signals generated from the first and the second pairs of strain detecting elements 5, 6 out may be formed as a part of the flexible substrate 68. Although in the present embodiment the flexible substrate 68 is provided with small holes 68 at four places to be fixed on base 64, the flexible substrate 68 may be attached with glue 69 on reinfocing sheet 62 which has been fixed to base 64 at four corners by engagement of fixing pin 64A and small hole 62B. Although the glue 69 has been described as that containing a thermo-setting resin as the main ingredient, other glues using a thermoplastic resin as the main ingredient may also be employed for the same purpose of detection by the detection elements 5, 6.

The invention may be embodied in other specific forms without departing from the spirit or essential characteristics thereof. For example, in the above embodiments only the exemplary cases in which four strain detecting elements are employed have been described, however the number does not always to be four, it may be at least two. Accordingly, it is intended that the appended claims be interpreted as covering all alterations and modifications as fall within the true spirit and scope of the invention.

What is claimed is:

1. A load sensor comprising:
   an elastic board having at least two strain detecting elements for sensing a load, said elastic board having a through hole positioned at a center thereof;
   an operating rod inserted in said through hole; and
   an operating part which is moved by movement of said operating rod, said operating part deforming at least one of said strain detecting elements when said operating part moves, at least one of said strain detecting elements sensing said load in response to said at least one of said strain detecting elements being deformed.

2. The load sensor of claim 1, further comprising a switch provided under said operating rod, said switch operated by said operating rod.

3. The load sensor of claim 2, wherein said switch is a switch that works with a click action.

4. The load sensor of claim 2, wherein surfaces of an outer wall of said operating rod and an inner wall of said through hole are tapered.

5. The load sensor of claim 2, wherein at least one of outer wall of said operating rod and inner wall of said through hole is provided with a stepped form.

6. The load sensor of claim 2, wherein said switch comprises a pair of fixed contact-points formed on a base of insulating material and an elastic movable contact-point disposed above the fixed contact-points.

7. The load sensor of claim 2, further comprising a buffer made of an elastic high polymer material provided between said switch and said operating rod.

8. The load sensor of claim 2, wherein said at least two strain detecting elements comprise strain gauges attached on said elastic board.

9. The load sensor of claim 2, wherein said at least two strain detecting elements comprise strain-responsive resistor elements formed by a printing process on said elastic board.

10. The load sensor of claim 1, further comprising a spring provided between the bottom end of said operating rod and said base for pushing said operating rod up.

11. The load sensor of claim 10, wherein said spring comprises a conical coil spring.

12. The load sensor of claim 10, wherein surfaces of an outer wall of said operating rod and an inner wall of said through hole are tapered.

13. The load sensor of claim 10, wherein at least one of outer wall of said operating rod and inner wall of said through hole is provided with a stepped form.

14. The load sensor of claim 1, further comprising a lock mechanism provided as a part of said base for stopping said operating rod at a predetermined position within a range of up and down motion.

15. The load sensor of claim 14, wherein said lock mechanism comprises a parallel spring held on said base and one of a groove and a step provided at the bottom end of said operating rod for a clamping with said spring.

16. The load sensor of claim 14, wherein said lock mechanism comprises a first holding part provided close to the bottom end of said operating rod, a second holding part provided as a part of said base at a middle level of up and down movement range of said first holding part, and a repulsion spring coupling said first holding part and said second holding part.

17. The load sensor of claim 14, wherein said lock mechanism comprises a lock body having a hollow and being linked with the up and down motion of said operating rod, and a cam having a pin for engagement with said hollow and being attached on said base.

18. The load sensor of claim 10, wherein said at least two strain detecting elements comprise strain gauges attached on said elastic board.

19. The load sensor of claim 10, wherein said at least two strain detecting elements comprise strain-responsive resistor elements formed by a printing process on said elastic board.

20. A pointing equipment comprising a load sensor of claim 10 or and a case with a lid, wherein said load sensor is incorporated in said case so that said operating rod is pressed down by said lid during off-service, and is held protruded during on-duty.

21. A load sensor comprising:
   an elastic board having at least two strain detecting elements;
   an operating rod provided at the center of said elastic board; and
   a base for fixing said elastic board at edges,
   wherein said elastic board comprises a substrate made of elastic insulating resin and a reinforcing sheet made of elastic metal overlaid together.

22. The load sensor of claim 21, wherein said substrate and said reinforcing sheet are provided with a hole at the center for inserting said operating rod.

23. The load sensor of claim 22, wherein said operating rod comprises a small-diameter part at the bottom for insertion to said hole and a round large-diameter part above the small-diameter part, wherein said substrate and said reinforcing sheet are clamped together by the bottom surface of said large-diameter part and a washer which is to be affixed to said small-diameter part.

24. The load sensor of claim 23, wherein said at least two strain detecting elements are disposed at vicinity of bottom edge of said large-diameter part or at the vicinity of outer edge of said washer.

25. The load sensor of claim 21, wherein said reinforcing sheet comprises bridges disposed on lines connecting each of said at least two strain detecting elements and said operating rod, said bridges having a predetermined width with the lines as center, and an outer frame connecting said bridges.

26. The load sensor of claim 21, wherein said substrate comprises a flexible substrate.

27. The load sensor of claim 26, wherein said flexible substrate and said reinforcing sheet are overlaid together with a glue.

28. The load sensor of claim 27, wherein said glue contains a thermosetting resin as main ingredient.

29. The load sensor of claim 21, wherein said at least two strain detecting elements comprise strain gauges attached on said elastic board.

30. The load sensor of claim 21, wherein said at least two strain detecting elements comprise strain-responsive resistor elements formed by a printing process on said elastic board.

31. The load sensor of claim 14, wherein said at least two strain detecting elements comprise strain gauges attached on said elastic board.

32. The load sensor of claim 14, wherein said at least two strain detecting elements comprise strain-responsive resistor elements formed by a printing process on said elastic board.

33. A pointing equipment comprising a load sensor of claim 14 and a case with a lid, wherein said load sensor is incorporated in said case so that said operating rod is pressed down by said lid during off-service, and is held protruded during on-duty.

* * * * *

UNITED STATES PATENT AND TRADEMARK OFFICE
CERTIFICATE OF CORRECTION

PATENT NO.    : 6,293,160 B1
DATED         : September 25, 2001
INVENTOR(S)   : Hideki Shigemoto It is certified that error appears in the above-identified patent and that said Letters Patent is hereby corrected as shown below:

<u>Column 15,</u>
Line 25, please insert -- the -- after "at".

Signed and Sealed this

Seventh Day of May, 2002

Attest:

JAMES E. ROGAN
*Attesting Officer*     *Director of the United States Patent and Trademark Office*